(12) United States Patent     (10) Patent No.:    US 8,805,737 B1
Chen et al.                                       (45) Date of Patent:    Aug. 12, 2014

(54) COMPUTER-IMPLEMENTED MULTIPLE ENTITY DYNAMIC SUMMARIZATION SYSTEMS AND METHODS

(75) Inventors: Kevin Chaowen Chen, San Diego, CA (US); Vijay S. Desai, San Diego, CA (US); William Szczuka, San Diego, CA (US); Andrew Engel, San Diego, CA (US); Ho Ming Luk, San Diego, CA (US); Brian Lee Duke, Poway, CA (US); Daniel J. Dotson, Poway, CA (US); Revathi Subramanian, San Diego, CA (US); Paul Charles Dulany, San Diego, CA (US)

(73) Assignee: SAS Institute Inc., Cary, NC (US)

(*) Notice: Subject to any disclaimer, the term of this patent is extended or adjusted under 35 U.S.C. 154(b) by 90 days.

(21) Appl. No.: 12/938,361

(22) Filed: Nov. 2, 2010

Related U.S. Application Data

(60) Provisional application No. 61/257,346, filed on Nov. 2, 2009.

(51) Int. Cl.
     *G06Q 40/00*         (2012.01)
     *G06Q 20/40*         (2012.01)
     *G06Q 40/02*         (2012.01)

(52) U.S. Cl.
     USPC .................. 705/38; 705/35; 705/44; 235/380

(58) Field of Classification Search
     CPC ..... G06Q 40/00; G06Q 40/025; G06Q 20/40; G06Q 20/4016; G06Q 40/02
     USPC ............. 705/7, 35, 38, 44; 715/205; 709/218, 709/226; 1/1; 235/380; 707/1
     See application file for complete search history.

(56) References Cited

U.S. PATENT DOCUMENTS

| | | | | |
|---|---|---|---|---|
| 5,130,924 | A * | 7/1992 | Barker et al. | 715/205 |
| 5,231,570 | A * | 7/1993 | Lee | 705/38 |
| 5,819,226 | A * | 10/1998 | Gopinathan et al. | 705/44 |
| 5,884,035 | A * | 3/1999 | Butman et al. | 709/218 |
| 5,884,289 | A * | 3/1999 | Anderson et al. | 705/44 |
| 6,119,103 | A * | 9/2000 | Basch et al. | 705/35 |
| 6,226,648 | B1 * | 5/2001 | Appleman et al. | 1/1 |
| 6,301,584 | B1 * | 10/2001 | Ranger | 1/1 |
| 6,330,546 | B1 * | 12/2001 | Gopinathan et al. | 705/35 |

(Continued)

OTHER PUBLICATIONS

•Stroud et al., One Valid Card let thieves raid Bank. MAGNA account numbers held key to others. Anti-Fraud system was not in use. St. Louis Post-Dispatch, Section: News. Aug. 13, 1998, p. A1.*

(Continued)

*Primary Examiner* — Barbara Joan Amelunxen
(74) *Attorney, Agent, or Firm* — Kilpatrick Townsend & Stockton LLP

(57) ABSTRACT

Systems and methods are provided for operation upon data processing devices are provided for operating with a fraud detection system. As an example, a system and method can be configured for receiving, throughout a current day in real-time or near real-time, financial transaction data representative of financial transactions initiated by different entities. At multiple times throughout the day, a summarization of the financial transaction data (which has been received within a time period within the current day) is generated. The generated summarization is used to determine whether fraud has occurred with respect to a financial transaction contained in the received authorization data or with respect to a subsequently occurring financial transaction.

36 Claims, 28 Drawing Sheets

(56) References Cited

U.S. PATENT DOCUMENTS

| | | | |
|---|---|---|---|
| 6,570,968 B1* | 5/2003 | Marchand et al. | 379/114.14 |
| 7,039,610 B2* | 5/2006 | Morano et al. | 705/37 |
| 7,117,191 B2* | 10/2006 | Gavan et al. | 706/47 |
| 7,251,624 B1* | 7/2007 | Lee et al. | 705/35 |
| 7,403,922 B1* | 7/2008 | Lewis et al. | 705/38 |
| 7,455,226 B1* | 11/2008 | Hammond et al. | 235/385 |
| 7,496,531 B1* | 2/2009 | Gastineau et al. | 705/35 |
| 7,685,052 B2* | 3/2010 | Waelbroeck et al. | 705/37 |
| 7,742,974 B2* | 6/2010 | Owens et al. | 705/37 |
| 7,797,226 B2* | 9/2010 | Ram et al. | 705/37 |
| 7,856,395 B2* | 12/2010 | Jackson et al. | 705/37 |
| 7,930,233 B2* | 4/2011 | Owens et al. | 705/36 R |
| 2002/0099649 A1* | 7/2002 | Lee et al. | 705/38 |
| 2002/0114435 A1* | 8/2002 | Lawyer et al. | 379/114.14 |
| 2002/0138417 A1* | 9/2002 | Lawrence | 705/38 |
| 2002/0194119 A1* | 12/2002 | Wright et al. | 705/38 |
| 2003/0009411 A1* | 1/2003 | Ram et al. | 705/37 |
| 2003/0093366 A1* | 5/2003 | Halper et al. | 705/38 |
| 2003/0097330 A1* | 5/2003 | Hillmer et al. | 705/38 |
| 2003/0191709 A1* | 10/2003 | Elston et al. | 705/40 |
| 2003/0233309 A1* | 12/2003 | Matus et al. | 705/37 |
| 2003/0236738 A1* | 12/2003 | Lange et al. | 705/37 |
| 2004/0010458 A1* | 1/2004 | Friedman | 705/35 |
| 2004/0225520 A1* | 11/2004 | Aoki et al. | 705/1 |
| 2005/0055373 A1* | 3/2005 | Forman | 707/104.1 |
| 2005/0098624 A1* | 5/2005 | Foss | 235/380 |
| 2005/0165668 A1* | 7/2005 | Hinkle | 705/37 |
| 2006/0020814 A1* | 1/2006 | Lieblich et al. | 713/182 |
| 2006/0069635 A1* | 3/2006 | Ram et al. | 705/37 |
| 2006/0149660 A1* | 7/2006 | Morano et al. | 705/37 |
| 2006/0161498 A1* | 7/2006 | Morano et al. | 705/37 |
| 2006/0259394 A1* | 11/2006 | Cushing et al. | 705/37 |
| 2007/0016506 A1* | 1/2007 | Davies et al. | 705/37 |
| 2007/0084913 A1* | 4/2007 | Weston | 235/380 |
| 2007/0106795 A1* | 5/2007 | Gilfix et al. | 709/226 |
| 2007/0118449 A1* | 5/2007 | De La Motte | 705/35 |
| 2007/0214045 A1* | 9/2007 | Subramanian et al. | 705/14 |
| 2008/0059382 A1* | 3/2008 | Burczyk | 705/36 R |
| 2008/0077551 A1* | 3/2008 | Akerman et al. | 707/1 |
| 2008/0313095 A1* | 12/2008 | Shalen | 705/36 R |
| 2009/0112747 A1* | 4/2009 | Mullen et al. | 705/35 |
| 2009/0234683 A1* | 9/2009 | Anderson et al. | 705/7 |
| 2009/0313161 A1* | 12/2009 | McAllister et al. | 705/37 |
| 2009/0319070 A1* | 12/2009 | Morningred et al. | 700/103 |
| 2009/0327153 A1* | 12/2009 | Milne | 705/36 R |
| 2010/0017323 A1* | 1/2010 | Zimmerman | 705/37 |
| 2010/0036672 A1* | 2/2010 | Li et al. | 705/1 |
| 2010/0036763 A1* | 2/2010 | Driscoll | 705/37 |
| 2010/0082500 A1* | 4/2010 | Lutnick et al. | 705/36 R |
| 2010/0125470 A1* | 5/2010 | Chisholm | 705/7 |
| 2010/0268663 A1* | 10/2010 | Asplund | 705/36 R |
| 2010/0301114 A1* | 12/2010 | Lo Faro et al. | 235/380 |
| 2011/0040667 A1* | 2/2011 | Montesano et al. | 705/37 |
| 2011/0040668 A1* | 2/2011 | Lee et al. | 705/37 |
| 2012/0185377 A1* | 7/2012 | Winters | 705/38 |

OTHER PUBLICATIONS

•Herman, Michael, Retailers warned over online fraud; Warning Signs: [2 Edition]. The Press [Christchurch, New Zealand] Jan. 29, 2004: B; 7. Database: ProQuest Central.*

•Rain, Lloyd. Procurement Card Fraud, Government Procurement, vol. 13, Is: 5, pp. 22, Oct. 24-27, 2005. Database: ProQuest Central.*

Stroud et al. Tim Bryant of the Post-Dispatch contributed to this story. One valid card let thieves raid bank magna account numbers held key to others anti-fraud syistem was not in use, St. Louis Post Dispatch, Section: News: Edition: Five Star Lift, Aug. 13, 1998.*

Rain, Lloyd, Procurement Card Fraud, Government Procurement 13.5 (Oct. 2005): 22,24-27. http://search.proquest.com/docview/219958574?accountid=14753.*

Herman, Michael, Retailers warned over online fraud; Warning Signs: [2 Edition], The Press, Christchurch, New Zealand, Jan. 29, 2004: b; 7. http://search.proquest.com/docview/314606658?accountid=14753.*

U.S. Appl. No. 11/691,270, filed Mar. 26, 2007, "Computer-Implemented Predictive Model Scoring Systems and Methods".

* cited by examiner

| FRAUD CATEGORY | DESCRIPTION | FRAUD TYPES |
|---|---|---|
| 10 | MOTO FRAUD | MO |
| 20 | FIRST PARTY FRAUD | FA, TK, NR |
| 30 | COUNTERFEIT FRAUD | CO |
| 40 | LOST AND STOLEN | LT, ST |

Fig. 27

COMPUTER-IMPLEMENTED MULTIPLE ENTITY DYNAMIC SUMMARIZATION SYSTEMS AND METHODS

CROSS-REFERENCE TO RELATED CASE

This application claims the benefit of and priority to U.S. Provisional Patent Application Ser. No. 61/257,346 entitled "Computer-Implemented Multiple Entity Dynamic Summarization Systems And Methods," filed Nov. 2, 2009, the entire disclosure of which (including the drawings) is incorporated herein by reference.

TECHNICAL FIELD

This document relates generally to computer predictive models and more particularly to fraud detection systems and methods.

BACKGROUND

Computer predictive models have been used for many years in a diverse number of areas, such as in the financial industry. The computer predictive models provide an automated or semi-automated mechanism for determining whether suspicious activity, such as credit card fraud, may have occurred. However, current systems have difficulty in determining how to address activity that has been deemed suspicious or fraudulent.

SUMMARY

In accordance with the teachings provided herein, systems and methods for operation upon data processing devices are provided for operating with a fraud detection system. As an example, a system and method can be configured for receiving, throughout a current day in real-time or near real-time, financial transaction data representative of financial transactions initiated by different entities. At multiple times throughout the day, a summarization of the financial transaction data (which has been received within a time period within the current day) is generated. The generated summarization contains fraud-indicative information regarding fraud at the entity or peer group level. The generated summarization is used to determine whether fraud has occurred with respect to a financial transaction contained in the received authorization data or with respect to a subsequently occurring financial transaction.

Still further, computer-implemented methods and systems are provided for operating with a financial fraud detection system. As an example, authorized transaction data records are received which are representative of financial transactions initiated by multiple entities and authorized by a financial institution. Fraud data records are received which are representative of financial transactions which have been indicated as fraudulent financial transactions. Financial transaction business rules are applied to an authorized transaction data record and a fraud data record for determining degree of relatedness between the authorized transaction data record and the fraud data record. Matching scores are determined based upon the step of applying the financial transaction business rules to the authorized transaction data records and the fraud data records. Associations are created between the authorized transaction data records and the fraud data records based upon the determined matching scores, thereby determining matched records.

Still further, computer-implemented methods and systems are provided to generate operation reason information for a fraud score generated by a predictive model. As an example, input data related to financial transactions is stored. The stored input data is associated with multiple different types of entities. A score is generated based upon data regarding a new incremental transaction with respect to an entity. Operation reason information associated with the score generated for the entity is generated, and a probability is also generated to indicate how likely a particular fraud type might be. The operation reason information provides operation reasons for value of the score generated for the entity. The generating of the operation reason information is based on fraud risk reason factors. The fraud risk reason factors were generated by grouping similar fraud risk reason variables together. The operation reason information is provided to a user for use in conducting fraud analysis.

BRIEF DESCRIPTION OF THE FIGURES

FIG. 27 is a table illustrating that fraud types can be grouped into multiple categories.

DETAILED DESCRIPTION

Figure 1:
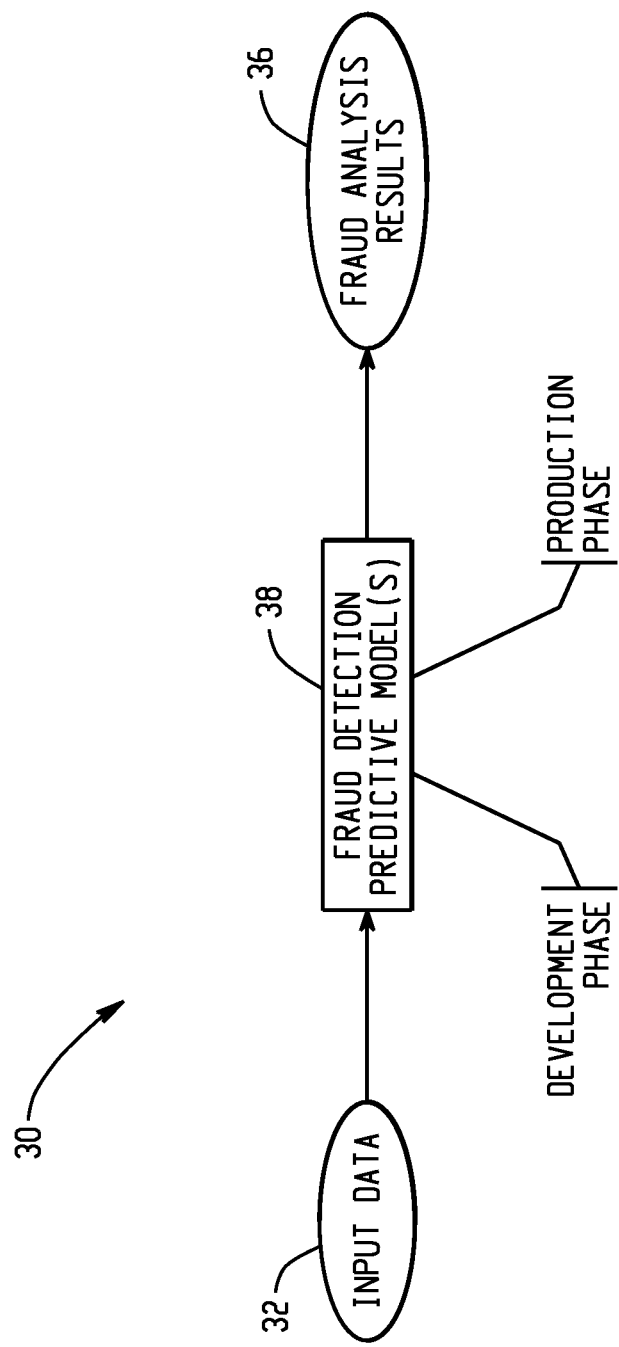
FIG. 1 is a block diagram depicting a computer-implemented system for generating and using predictive models to assess whether fraudulent activity may have occurred.

FIG. 1 depicts at 30 a computer-implemented system for generating and using predictive models 38 to assess whether fraudulent activity may have occurred. Accurate detection of fraud is important in that it results in action being taken earlier and in a more effective manner for addressing the fraudulent activity. An action could include for example whether a credit card company should personally investigate if fraud may have occurred with respect to a particular credit card holder. It should also be understood that the system 30 can be configured to process one entity or many entities.

As shown in FIG. 1, input data 32 is used during a development phase to create/train one or more predictive models 38. The predictive models 38 are then used during a production phase to receive input 32, such as from a financial institution, to generate fraud analysis results 36.

Figure 2:
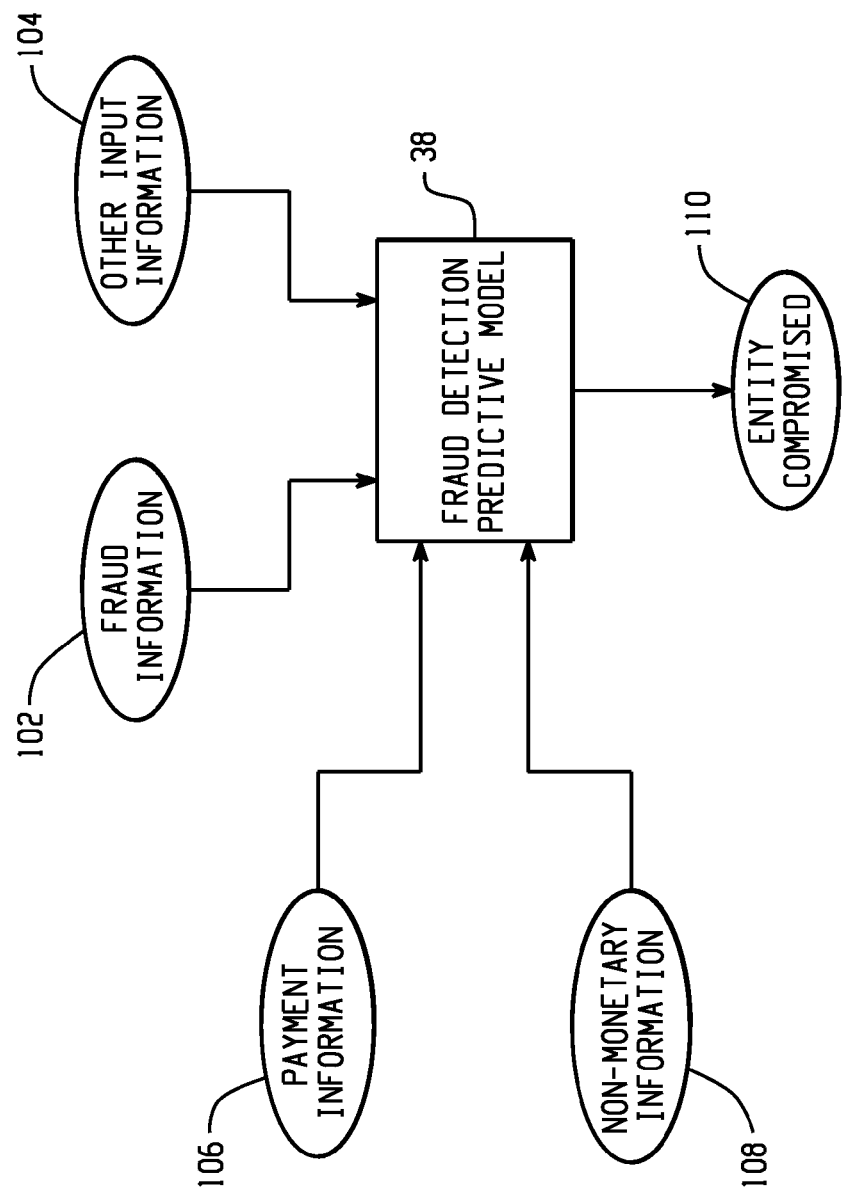
FIG. 2 is a block diagram depicting examples of input data.

Whether in the development phase or in the production phase, the input data 32 can be of many different types. Examples of such input data 32 are shown in FIG. 2. With reference to FIG. 2, a fraud detection model 38 can receive fraud information 102 and other input information 104, such as posting/transaction information, authorization information, cycle cut information, etc. (Postings are the process for the recording of debits and credits to individual cardholder account balances.)

An example of fraud data could be the date of the first fraud as reported by a customer. For example, a customer may call a financial institution to indicate that one or more transactions that appeared on their credit card statement and represent a fraudulent use. An example of fraud is when a person steals a credit card number and uses it to purchase items.

The input fraud data can include several dates, such as the date on which fraud was first suspected to have occurred and a block date which is the date on which no further transactions should be authorized. A predictive model 38 can be trained to detect fraud (e.g., whether an entity has been compromised as shown at 110) within this account compromise period as early as possible.

The system can also utilize payment information 106 and/or non-monetary information 108 to detect whether the account is in a fraud state. An example of payment information is the credit card payment information received on a monthly or other periodic basis. An example of non-monetary data is an address change, phone change, mother's maiden name change, or credit line change.

Figure 3:
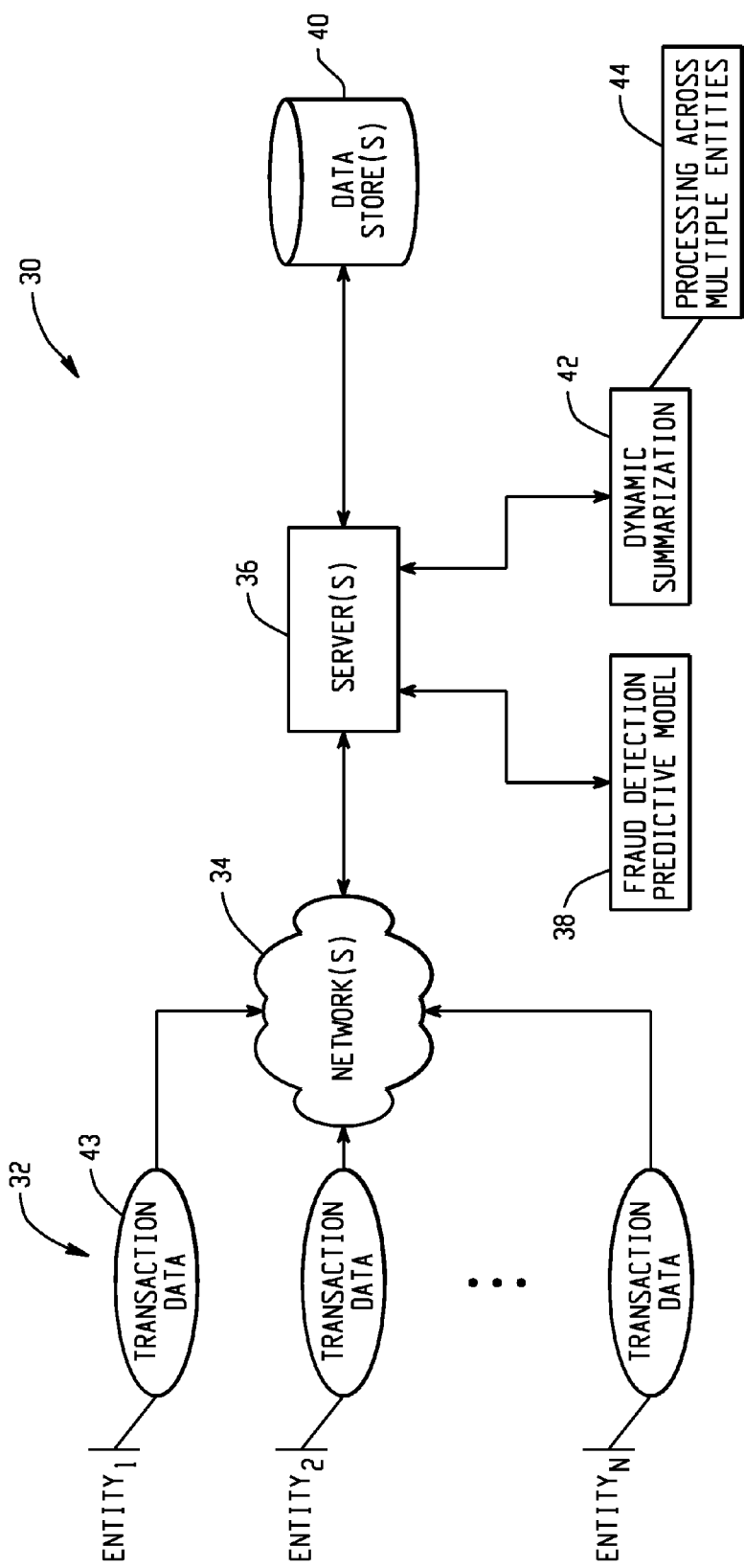
FIG. 3 is a block diagram depicting a computer-implemented system for detecting fraudulent activity.

FIG. 3 depicts at 30 a computer-implemented system for detecting fraudulent activity with respect to one or more financial transactions. The system 30 allows for detection of fraud that occurs with respect to multiple entities (e.g., $entity_1$, $entity_2$, $entity_N$), thereby accurately capturing a type of fraud which may be difficult to capture through analysis of only one transaction at a time. Such accurate detection of fraud results in action being taken earlier and in a more effective manner for addressing this type of fraudulent activity (or other types of fraudulent activity). An action could include for example whether a credit card company should personally investigate if fraud has consistently occurred at a particular ATM machine, merchant location, etc.

As shown in FIG. 3, financial transaction data 32 is received over network(s) 34 by one or more servers 36. Resident on the server(s) 36, a fraud detection predictive model 38 processes the financial transaction data 32 to determine whether fraudulent activity has occurred. The financial transaction data 32 can include many different types of transactions, such as credit card purchases of goods or services, ATM transactions (e.g., cash withdrawals, fund transfers, cash deposits, balance inquiries, etc.), etc. One or more data stores 40 store the data to be analyzed by the fraud detection predictive model 38 as well as any intermediate or final data generated within the system 30.

The fraud detection predictive model 38 can itself consist of one model or comprise a group of models, which are configured to detect fraud based upon financial transaction data and other relevant data. The models can include a neural network model, a decision tree model, logistic regression model, a linear regression model, etc. As an illustration, a fraud detection predictive model can include a neural network which has been specially trained to detect fraud on an account level. An example of a model that has been configured to detect fraud on an account level is described in the following patent document: U.S. patent application Ser. No. 11/691,270 filed Mar. 26, 2007 and entitled "Computer-Implemented Predictive Model Scoring Systems And Methods" which is incorporated herein by reference. As an example of a different approach, a fraud detection predictive model can be a neural network which has been specially trained to detect fraud only on a transaction level.

Financial transaction data (e.g., financial transaction data 43) received over the network(s) 34 is associated with an entity (e.g., $entity_1$). The entity could be associated with the account through which the transaction occurred or with just the transaction (e.g., a terminal, merchant, peer group, etc.). An entity could be the individual which used his or her credit card to purchase an item. However, it should be understood that many other types of entities may be involved, such as a corporation which is associated with an account, etc. The example shown in FIG. 3 illustrates that different entities (e.g., different individuals, corporations, etc.) can be associated with the transactions that are to be processed by the fraud detection predictive model.

The system 30 further includes a dynamic summarization process 42, which can be operating on the same server which contains the fraud detection predictive model 38 or can be separately located, such as on a different server. The dynamic summarization process 42 summarizes information from the fraud detection predictive model 38 and the financial transaction data 32 at different points in time, such as at multiple times during the day in which the financial transaction data 32 was generated and processed by the fraud detection predictive model. For example as shown at 44, the dynamic summarization process 42 summarizes financial transaction data (e.g., authorization activity transaction data) at entities/peer groups other than the cardholder/account holder level. The dynamic summarization process 44 periodically (e.g., throughout the day, once a week, etc.) summarizes batches of data as authorizations are passed to the fraud detection predictive model 38.

The summarized data is used to determine whether fraud has occurred with respect to a financial transaction contained in the received authorization data or with respect to a subsequently occurring financial transaction. For example, the summarized data can be analyzed to determine whether fraud has been significantly prevalent at a particular merchant location. A financial transaction (that may not have been tagged as fraud when initially processed by a predictive model) may then be reexamined because the transaction had transpired at that merchant location. As another example, because a particular merchant location has been determined as having an unusual number of suspicious transactions, subsequent transactions occurring at the same merchant location can be analyzed by a predictive model with heightened scrutiny. Additionally, when a subsequent transaction is received, the summarized data can be combined with that transaction's data and processed by the initial predictive model in real-time to determine if this subsequent transaction is fraudulent.

Figure 4:
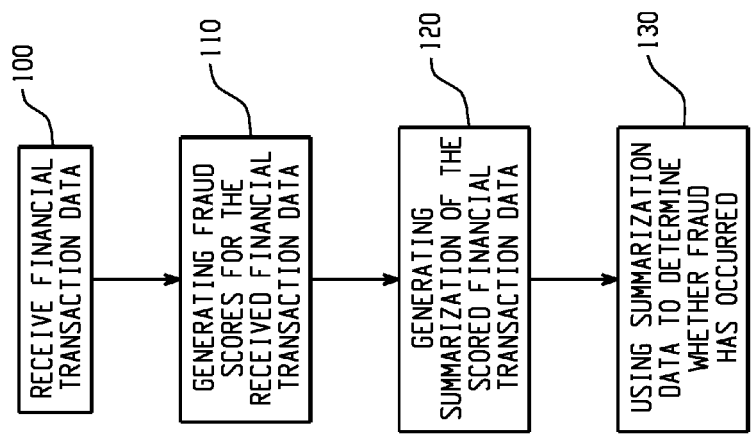
FIG. 4 is a flowchart depicting an operational scenario utilizing a dynamic summarization process.

FIG. 4 is a flowchart depicting an operational scenario utilizing a dynamic summarization process. At step 100, financial transaction data is received for processing by a fraud detection predictive model. At step 110, the fraud detection predictive model generates fraud indicative scores in real-time or near real-time based upon the received financial transactions data combined with summarized data from previous transactions. Step 120 involves summarization of the scored financial transaction data. For subsequent transactions, the summarization is used at step 130 along with the new transactional information to determine whether or not fraud is occurring.

Figure 5:
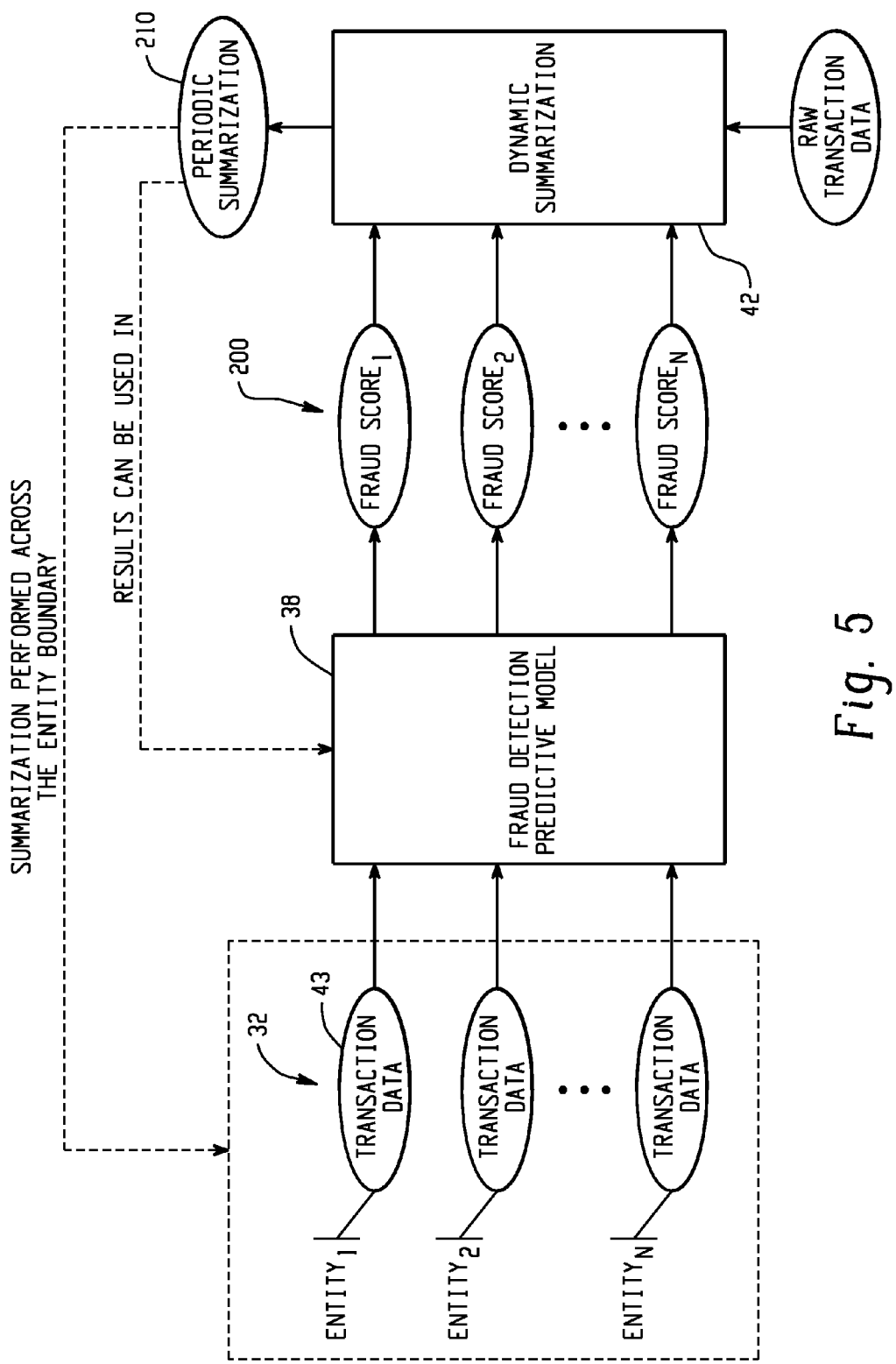
FIG. 5 is a block diagram depicting summarization across multiple entities.

FIG. 5 illustrates that the summarization involved in the operational scenario of FIG. 4 is a summarization 210 that crosses the entity boundary. More specifically, the fraud detection predictive model 38 generates fraud scores 200 for the account associated with each entity. The dynamic summarization process 42 generates a summarization 210 of the properties of the fraud transaction data, including the scores. Because the summarization 210 crosses the entity boundary, fraud which transcends the entity boundary can be more properly detected. Additionally, if desired, the results of the periodic summarization 210 can be used by the fraud detection predictive model 38 to help detect fraud for future transactions. It should also be understood that the dynamic summarization process 42 can generate the periodic summarization 42 as disclosed herein by using additional data, such as "raw" transaction data. Examples of "raw" transaction data are provided in the aforementioned patent application U.S. patent application Ser. No. 11/691,270.

Figure 6:
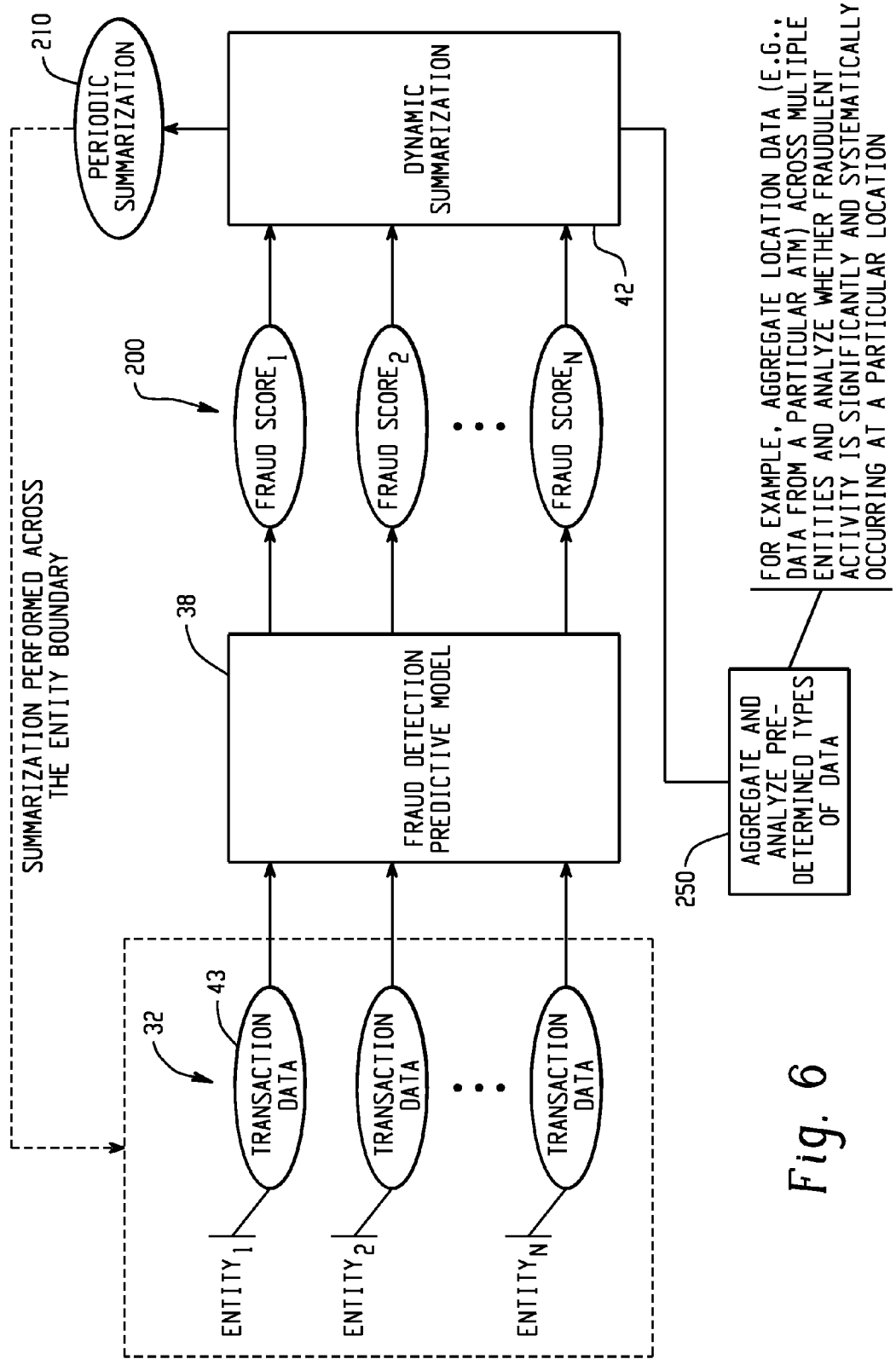
FIG. 6 is a block diagram depicting a dynamic summarization process.

FIG. 6 depicts at 250 an aggregation process which the dynamic summarization process 42 can use to generate the summarization 210. Process 250 involves aggregating and analyzing pre-determined types of data that are present in the received financial transaction data 32. For example, process 250 can aggregate fraud score information based upon location. In this example, process 250 may aggregate fraud score information that has been generated for multiple entities based upon the multiple entities having the same transaction location. This can provide for identifying fraud that is systematically occurring at the same merchant shop over a period of time.

As another example, the dynamic summarization process 42 can be used to detect a situation involving a fraudster who starts with a particular credit card number and increments the number until the fraudster can find a credit card number that works. The dynamic summarization process 42 can summarize a portion of credit card numbers over a period of time to determine whether such a situation may be occurring for a group of cards.

Figure 7:
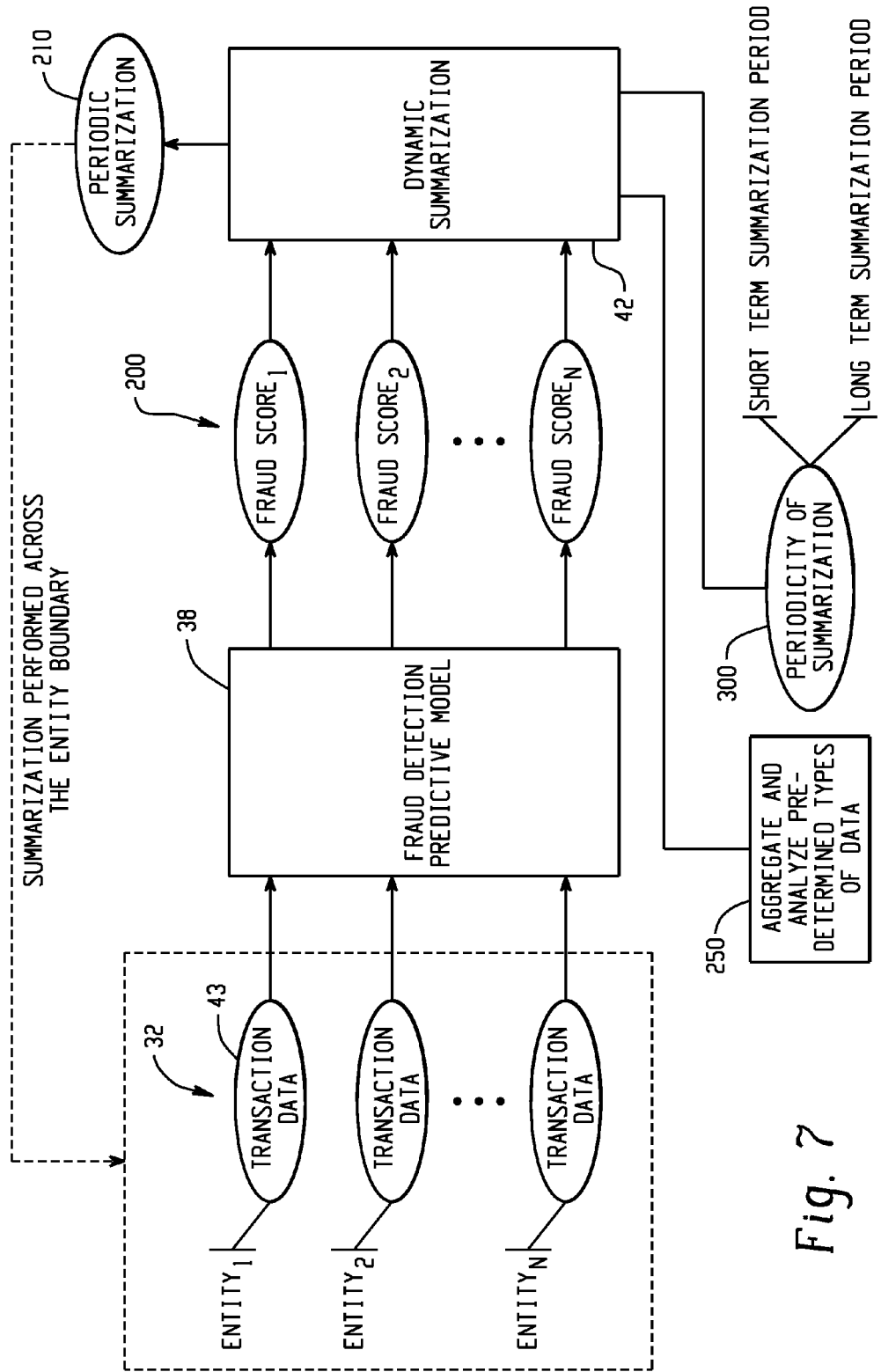
FIGS. 7 and 8 are block diagrams depicting a dynamic summarization process having different summarization periods.

FIG. 7 depicts that the dynamic summarization process 42 can utilize different summarization periods to suit the situation at hand. For example, the periodicity 300 for summarization could be a short-term period (e.g., every two hours), or as illustrated in FIG. 8, the periodicity 300 for summarization could be a long-term period (e.g., once a month).

Figure 8:
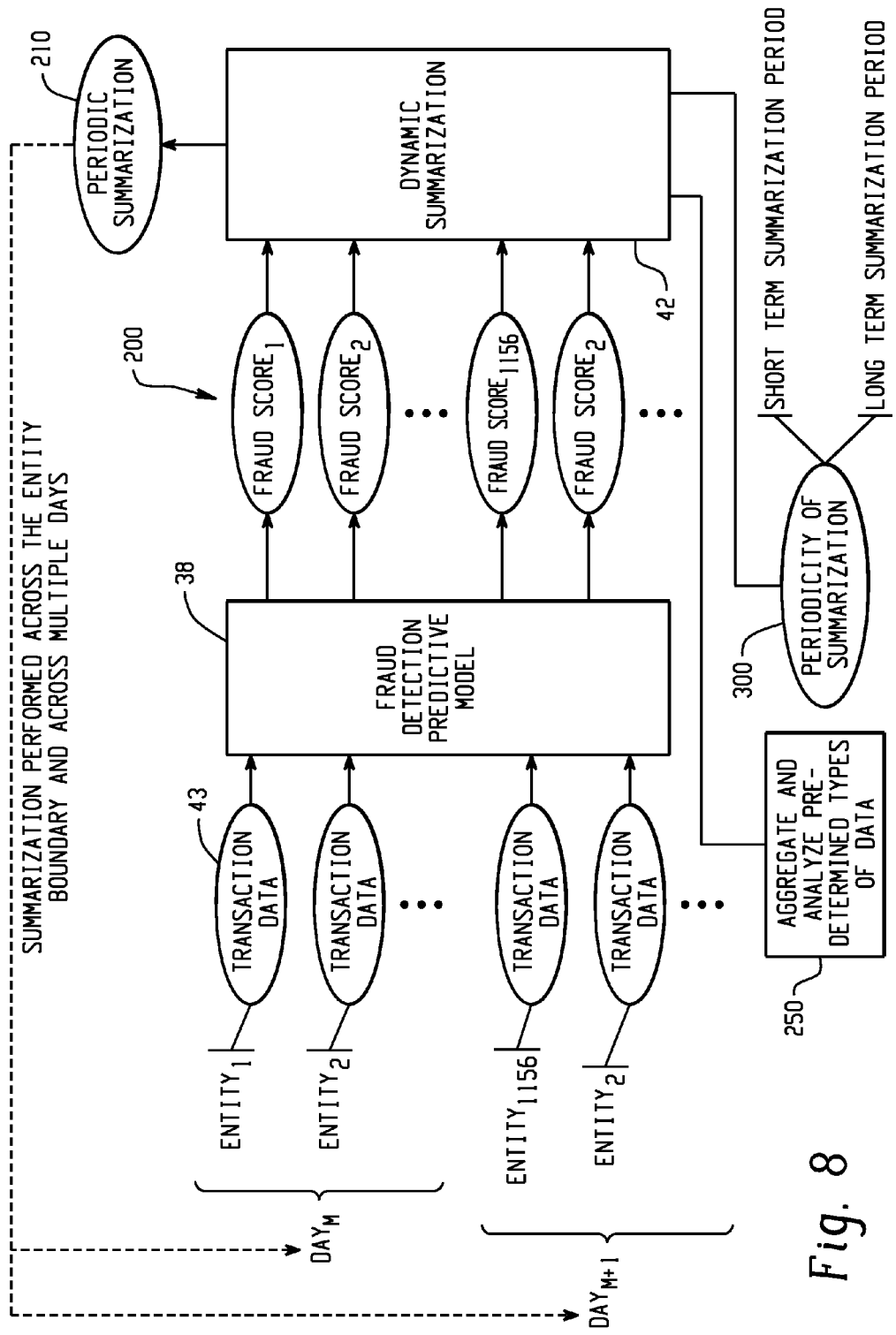

In the example of FIG. 8, $entity_2$ has purchased items at the same merchant location for two successive days. If $entity_1$ and $entity_{1156}$ have also purchased items at the same merchant location, then their respective fraud related information would be included in the dynamic summarization process 42. Accordingly, the summarization can be performed not only across the entity boundary but also across multiple days.

Figure 9:
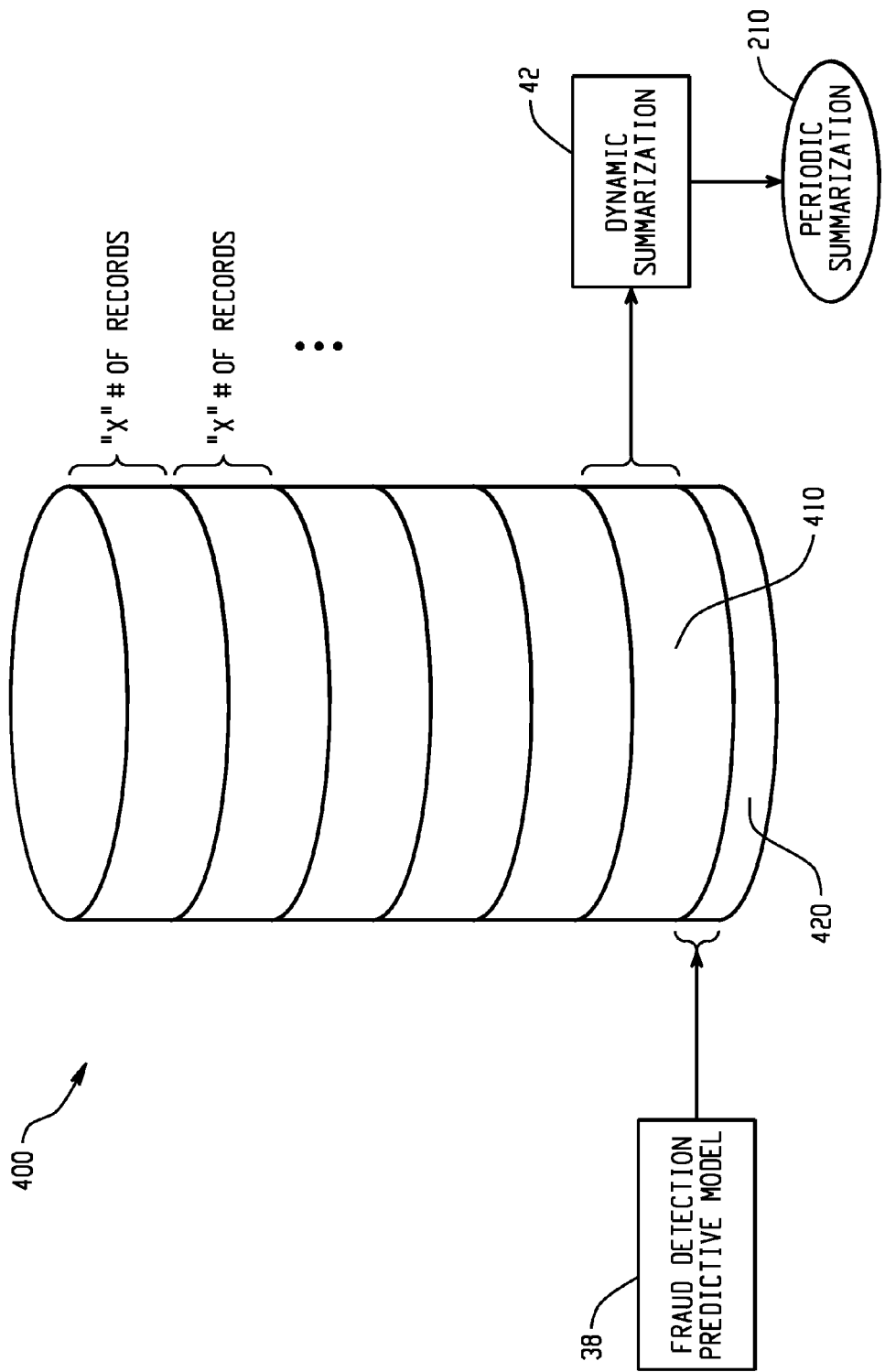
FIGS. 9 and 10 are block diagrams depicting different approaches for triggering a periodic summarization process.

FIGS. 7 and 8 illustrate that different approaches can be used to trigger the periodic summarization process 42. In FIG. 9, the fraud detection predictive model 38 stores fraud score results in a data store 400 which also can store transaction data. The dynamic summarization process 42 is triggered when a predetermined number of records have been reached since the last time the dynamic summarization process was performed. The example of FIG. 9 depicts that the dynamic summarization process 42 processes a set 410 of "x" number of records, while the fraud detection predictive model 38 is storing the next set 420 of records. Because the triggering criteria is based on reaching a particular number of records, the time period within which the dynamic summarization process 42 is triggered may vary.

Figure 10:
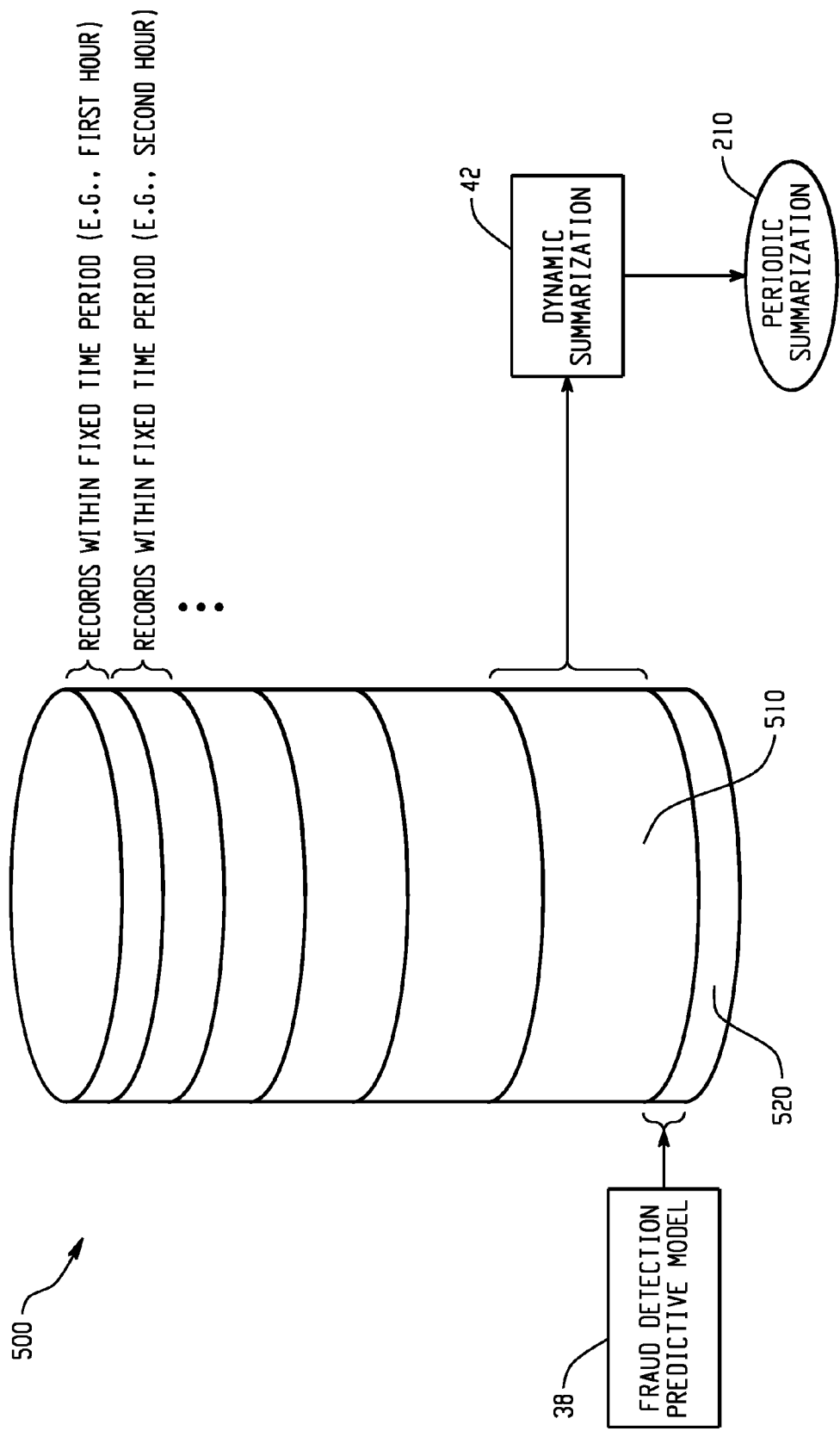

In FIG. 10, the fraud detection predictive model 38 stores fraud score results in a data store 500 which also can store transaction data. The dynamic summarization process 42 is triggered when a certain period of time (e.g., every hour, every two hours, etc.) has elapsed. The example of FIG. 10 depicts that the dynamic summarization process 42 processes a set of records 510, while the fraud detection predictive model 38 is storing the next set 520 of records. Because the triggering criteria is time based, the number of records to be processed by the dynamic summarization process 42 may vary.

It should be understood that the data stores in these examples could be a single database stored on a server or could comprise multiple databases, wherein one database stores the most recent results of the fraud detection predictive model 38 and data records are transferred to another database on a different server for processing by the dynamic summarization process 42.

A dynamic summarization process 42 can use different period lengths to better suit the situation at hand. For example, a longer period length can be used during the portions of the day when commercial transactions are not as prevalent (e.g., after or before typical business hours), and a shorter period length can be used during the portions of the day when most commercial transactions occur (e.g., during typical business hours). A dynamic summarization process 42 can also use various combinations of short-term periods and long-term periods. As an illustration, a dynamic summarization process 42 can include a first summarization process which uses a short-term period and include a second summarization process which uses a long-term period. A fraud detection prediction model can utilize both summarization results to improve the fraud scoring process.

Figure 11:
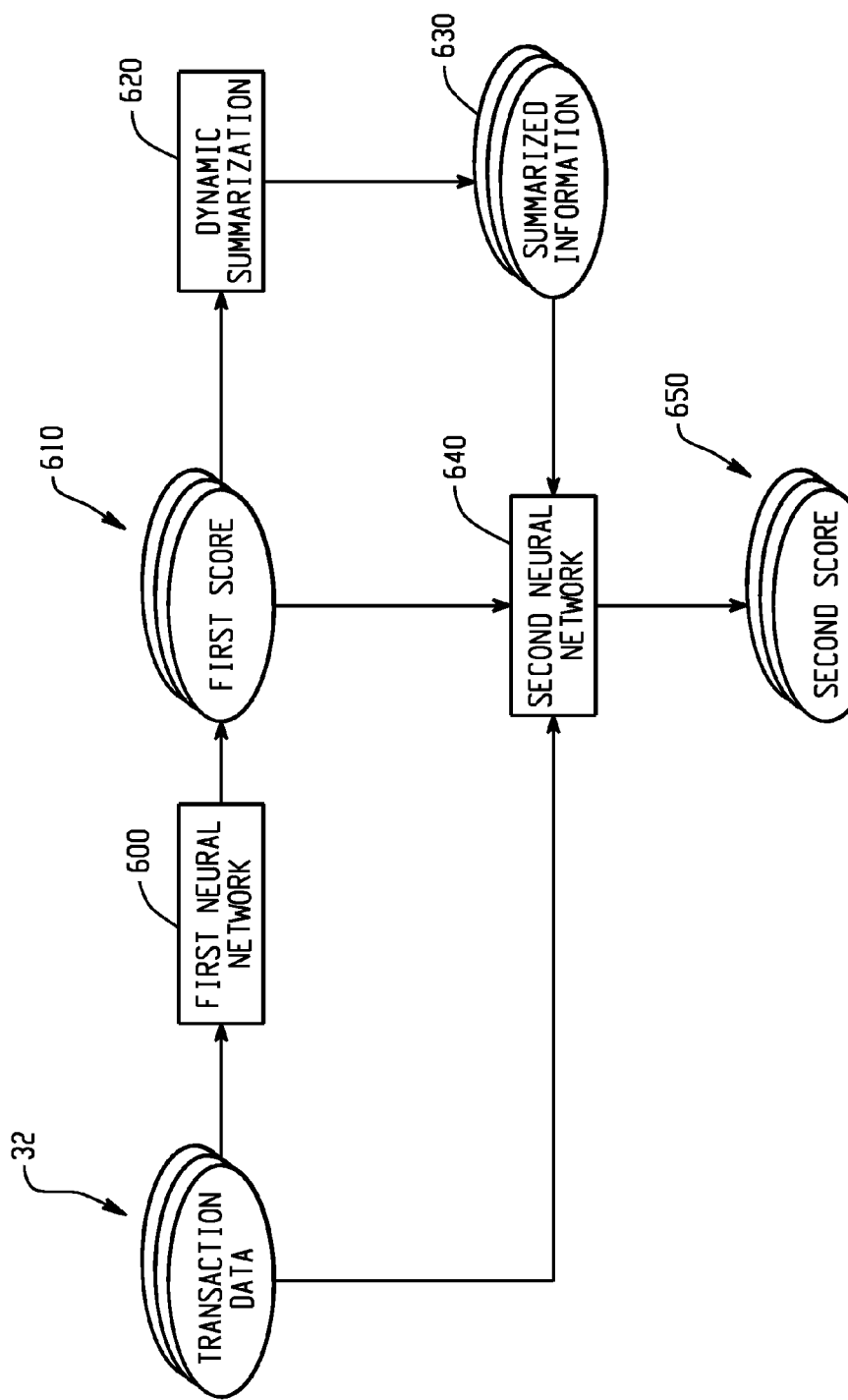
FIGS. 11 and 12 are block diagrams depicting one or more neural networks being used as fraud detection predictive models.

FIG. 11 depicts using multiple neural networks (600, 640) as fraud detection predictive models. The first neural network 600 processes financial transaction data 32 and related data to generate a first set of fraud scores 610. A dynamic summarization process 620 utilizes the first scores 610 and the transaction data 32 to generate summarized information 630.

The second neural network 640 provides an improvement over the predictive capability of the first neural network 600 because the second neural network 640 uses not only the transaction data 32 and related data, but also uses the first fraud scores 610 and the summarized information 630 to generate a second set of fraud score 650. This improvement is a result, at least in part, because of the summarized information 630 which allows the second neural network to more properly detect fraud which transcends the entity boundary.

Figure 12:
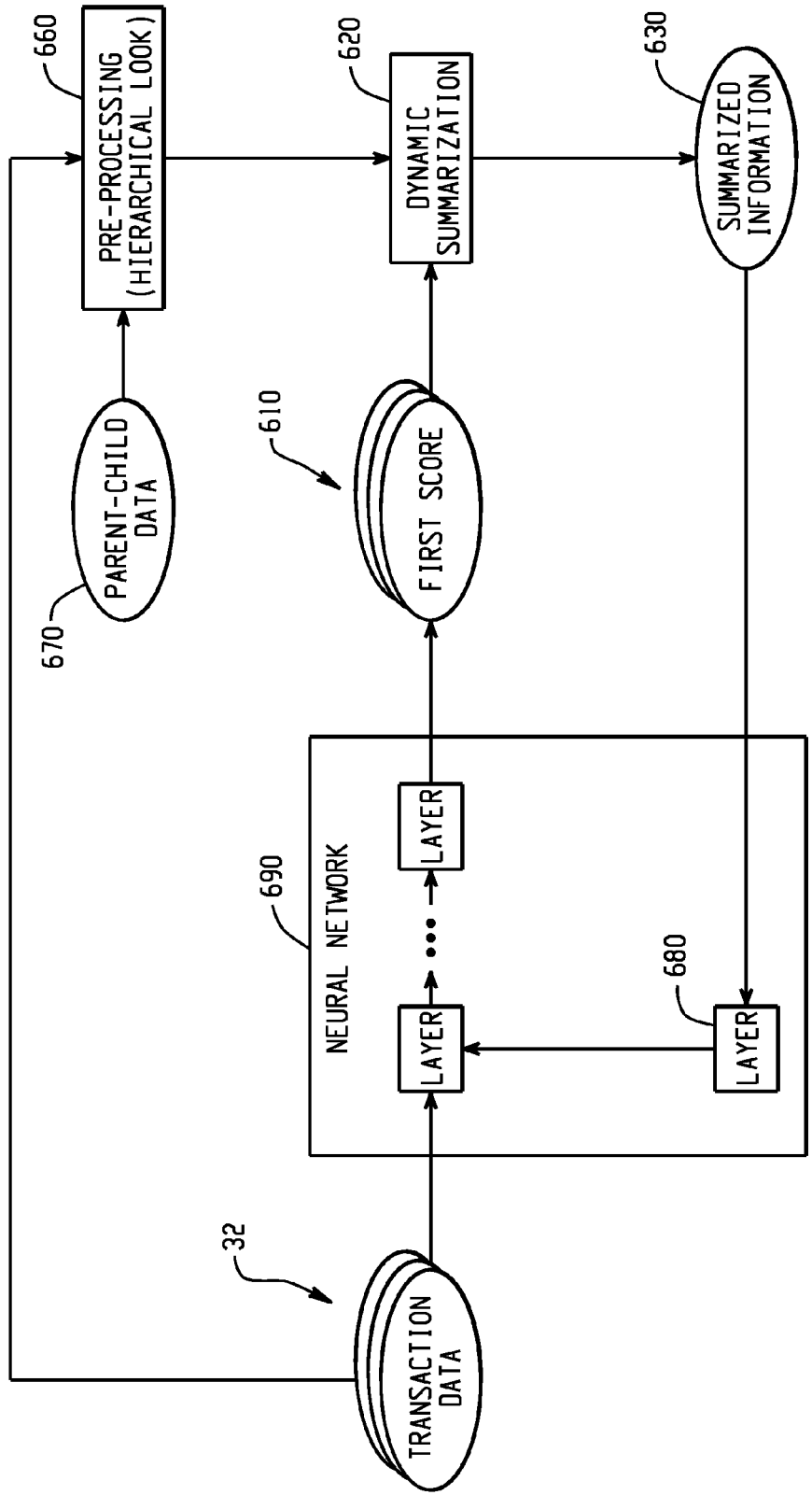

The neural networks (600, 640) can be constructed in many different ways. For example, the first neural network 600 and the second neural network 640 may comprise two separate and distinct neural networks as shown in FIG. 11. FIG. 12 provides another configuration example.

With reference to FIG. 12, summarized information 630 from the dynamic summarization process 620 can be fed into a separate layer 680 of the neural network 690 which had originally generated the first set of scores 610. Within the layer 680, node variables are used to represent the summarized information within the layer 680 and can be based upon the following data which typically appear in financial transaction data:

Merchant category code (MCC): a universal four-digit classification code describing what type of goods or services a particular business predominantly provides
    Merchant ID
    Merchant postal code
    Account group
    Country code
    Terminal ID
    etc.

As an illustration, the dynamic summarization process 620 can determine whether significantly unusual activity or significantly unusual amount of fraud or both have occurred with respect to a particular merchant (using merchant ID information), and provide that information to the neural network 690 through layer 680.

The system can also be configured to pre-process the transaction data at 660 using parent-child hierarchical data 670 to fill in any information which might be missing. For example, if lower level information is missing from a transaction record, then suitable information may be supplied by other information which exists at a higher level. In other words, higher level information (while not having the level of detail as the missing data) can still be useful as a proxy. As an illustration, if a merchant's postal ZIP code associated with a transaction is not entirely recognizable (possibly because the ZIP code is relatively new), the system can use the ZIP code hierarchy with respect to a received merchant postal code by examining digits appearing earlier in the postal code sequence to provide high-level geographical location information if the entire ZIP code is not recognizable.

As another illustration, a transaction data record may not include the location of the transaction (e.g., the location of the ATM machine). In such a situation, the pre-processing routine 660 can examine related information to determine generally the location of the transaction. For example, within the context of an ATM machine, the related information can be the residential locations of account holders who have previously used the ATM machine, which can be used as a general indicator for the location of the ATM machine itself.

As another illustration, the system depicted in FIG. 12 could have the pre-processing routine 660 configured to operate between transaction 32 and neural network 690. This allows the results of the pre-processing to be available not only to the dynamic summarization process 620 but also to neural network 690.

Figure 13:
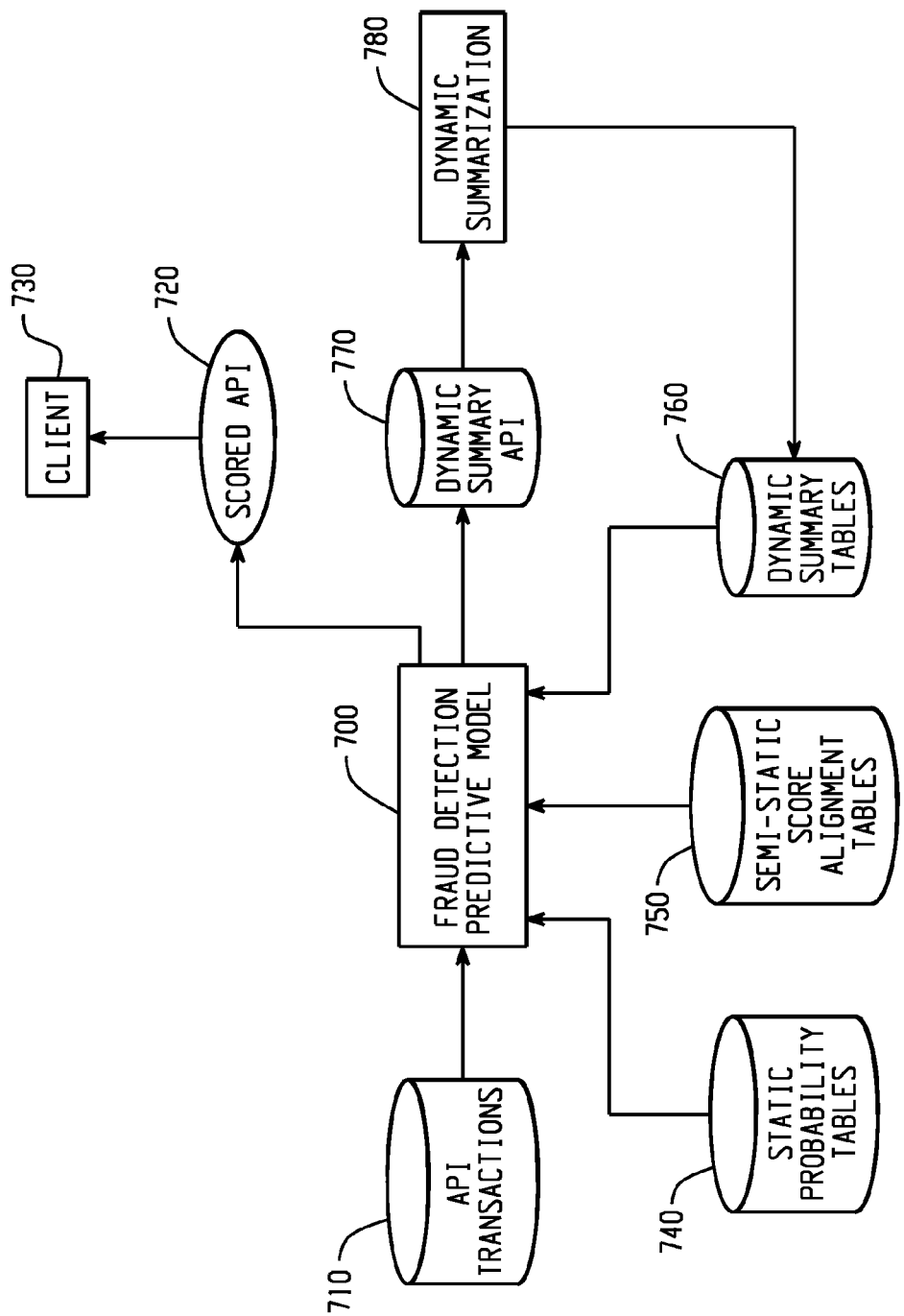
FIGS. 13 and 14 are block diagrams depicting multiple summarization processes.

FIG. 13 illustrates yet another configuration within which a dynamic summarization process can occur. In FIG. 13, a fraud detection predictive model 700 is provided with financial transaction information through an API 710 (application programming interface). The API 710 comprises an interface that the fraud detection predictive model software program uses to allow interaction with other programs, such as those that provide financial transaction data. The fraud detection predictive model 700 generates a scored API 720 (e.g., the input API augmented with a fraud score) for client 730 (e.g., an issuer) based upon the transaction data and information from a static probability table 740, a semi-static score alignment table 750, and a dynamic summary table 760. The static probability table 740 contains such information as likelihood of fraud at various entity levels. The semi-static score alignment table 750 contains information of the model score with and without the dynamic summarization information for alignment to the desired score curve. This allows only minimal changes being required to production rules and strategies if a problem arises with the summarization processing.

The dynamic summary table 760 contains such information as periodic summarizations that have been previously generated from the dynamic summarization process 780. An API 770 is also used to provide score results of the fraud detection predictive model 700 to the dynamic summarization process 780 in order to generate periodic summarizations for scoring subsequent financial transactions.

Figure 14:
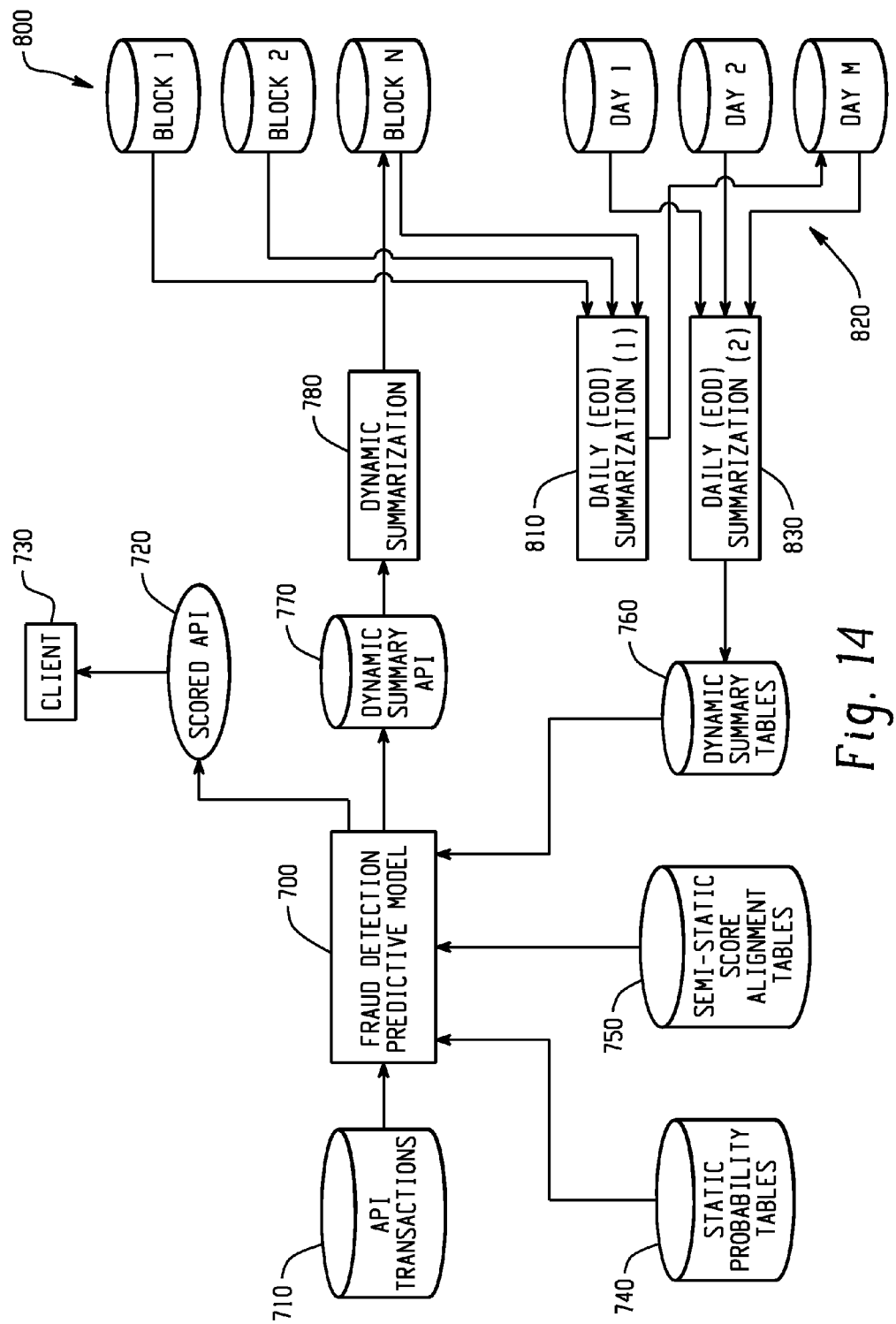

FIG. 14 depicts a configuration within which the dynamic summarization results can be stored and utilized within a fraud detection predictive system. In this configuration, the dynamic summarization process 780 stores its results throughout the day in different data blocks 800. At the end of a day, process 810 retrieves summarization results that were stored in the data blocks 800 and summarizes all of the activity for storage in one of the data stores 820. Another process 830 retrieves the information from the data stores 820 and analyzes the summarizations over multiple days. The analysis results are stored in a dynamic summary table 760 for subsequent use by the fraud detection predictive model 700 to generate fraud scores for subsequent situations.

In this example, it is noted that all of the raw quantities in the tables may be biased if used as raw inputs to the model unless the data used to do the summarization was a 100% sample of the data. Because developing a fraud model with 100% sample of data is typically not practical, a 1% or 10% sample can be used. In this case, all of the total counts and total amounts in the dynamic summarization tables may be far too small compared with what will be seen if summarization is performed in production.

For this reason, variables that are used in the dynamic summarization portion of the model are ratios between two quantities. For example, the ratio of the total number of transactions scoring above a given threshold may be compared to the total number transactions at a particular MCC. This quantity can be considered a pseudo-bad rate and is not affected by down-sampling in the same way that raw counts are affected. Another example can include the ratio of the number of transactions over the last three days to the total number transactions of the last 30 days for a particular merchant ID.

Another set of variables that can be used includes comparisons between a "child" table value and a "parent" table value. For example, the "child" table may be the first thirteen digits of the account number (account group) and the "parent" may be the first six digits of the account number (BIN). A comparison of the total number transactions from the "child" table to the total number transactions from the "parent" table can provide another mechanism for avoiding potential problems caused by down-sampling.

The "parent-child" structure can also be used to determine whether the statistics of a child entity is out of norm by comparing it to the more generic statistics at the parent calculated from its peers. An example is when there is a holiday sales, even though the statistics of the child is unusual comparing to its normal behavior due to increase of sales, when comparing it to the peers who are likely to have similar sales using the statistics stored at the parents, it can be determined that the increase of sales is actually normal.

Other variables that can be created are comparisons between the current transaction and the average behavior for a given entity. As an illustration, suppose that a transaction scored above a prescribed score threshold. However in the dynamic summarization table related to MCCs, only 1% of the transactions scored above the same threshold (total number transactions scored above threshold/total number of transactions). The difference between these two quantities (1−0.01=0.99) can be used as a proxy for how much difference there is between this transaction and its peers. If the difference is positive, this is an indication that the transaction may be riskier than the base model would have considered it to be, and if it is negative, it may be less risky than the base model would have considered it to be.

The systems and method can include other embodiments. As an illustration, a dynamic summarization can be performed for many different situations and entities. As described above, a system and method can be configured to detect a test merchant situation. This situation can include fraudsters targeting one or several merchants (e.g., on-line merchants) to test the validity of plastic card information. As another example, a system and method can be configured to include detection on BIN ranges, Internet addresses, mobile device identifiers, etc. Additional entities can be analyzed, such as terminal id, card entities, account entities, and customer entities. The interaction among two or more entities can also be analyzed by treating the 'group' as an entity.

As another illustration of the wide scope of the disclosure herein, a system and method can be configured as described herein to use fresh transactions coming into the system and method without any knowledge of whether the card/account have been compromised. A system and method could also be configured to incorporate/summarize the fraud statistics for entities via a "fraud tagging process" that is done periodically in the backend. In such a system and method, a batch process is used that marks the period as well as individual transactions as frauds based on feedback provided by users (e.g., a financial institution such as a plastic card issuer). The process could have delays ranging from a day to several months depending on how soon the frauds are identified and confirmed by the users. The tagged transactions are then summarized by the dynamic summarization process in order for the system and method to estimate the fraud statistics at various entity-levels.

As another illustration of the wide scope of the disclosure herein, a system can be configured to perform dynamic summarization by storing the raw transaction data over a prolonged period of time and making such data available for performing data summarizations at different points in time. The system can store the raw data using the approaches described in the following patent document: U.S. patent application Ser. No. 11/691,270 filed Mar. 26, 2007 and entitled "Computer-Implemented Predictive Model Scoring Systems And Methods" which is incorporated herein by reference. As an illustration, FIGS. 15 and 16 depict an approach for storing raw transaction.

Figure 15:
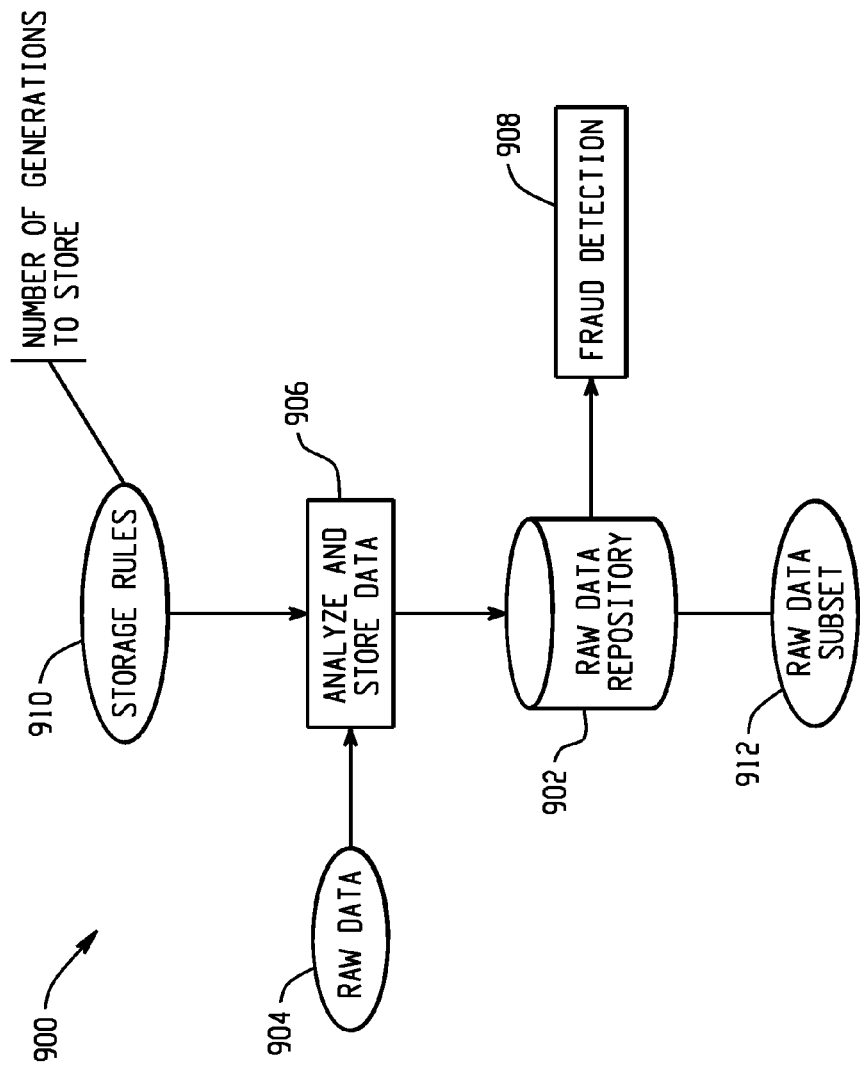
FIG. 15 is a block diagram depicting a system for storing information for use in fraud detection.

FIG. 15 depicts a system for storing information for use in fraud detection. The system of FIG. 15 stores the raw data instead of derived feature information which is used in typical current systems. The typical current system's storage approach creates problems because there may be a need to view past transactions in context of the account's or card's past history, such as for use in a dynamic summarization process. A significant portion of the raw historical transactions could be included for each score. However, for real-time systems, this has proven to have an unacceptable impact on throughput and response time. Alternative schemes involve saving only summarized information. While this does reduce the throughput, it also limits the types of variables and the level of detail available to the model.

Figure 16:
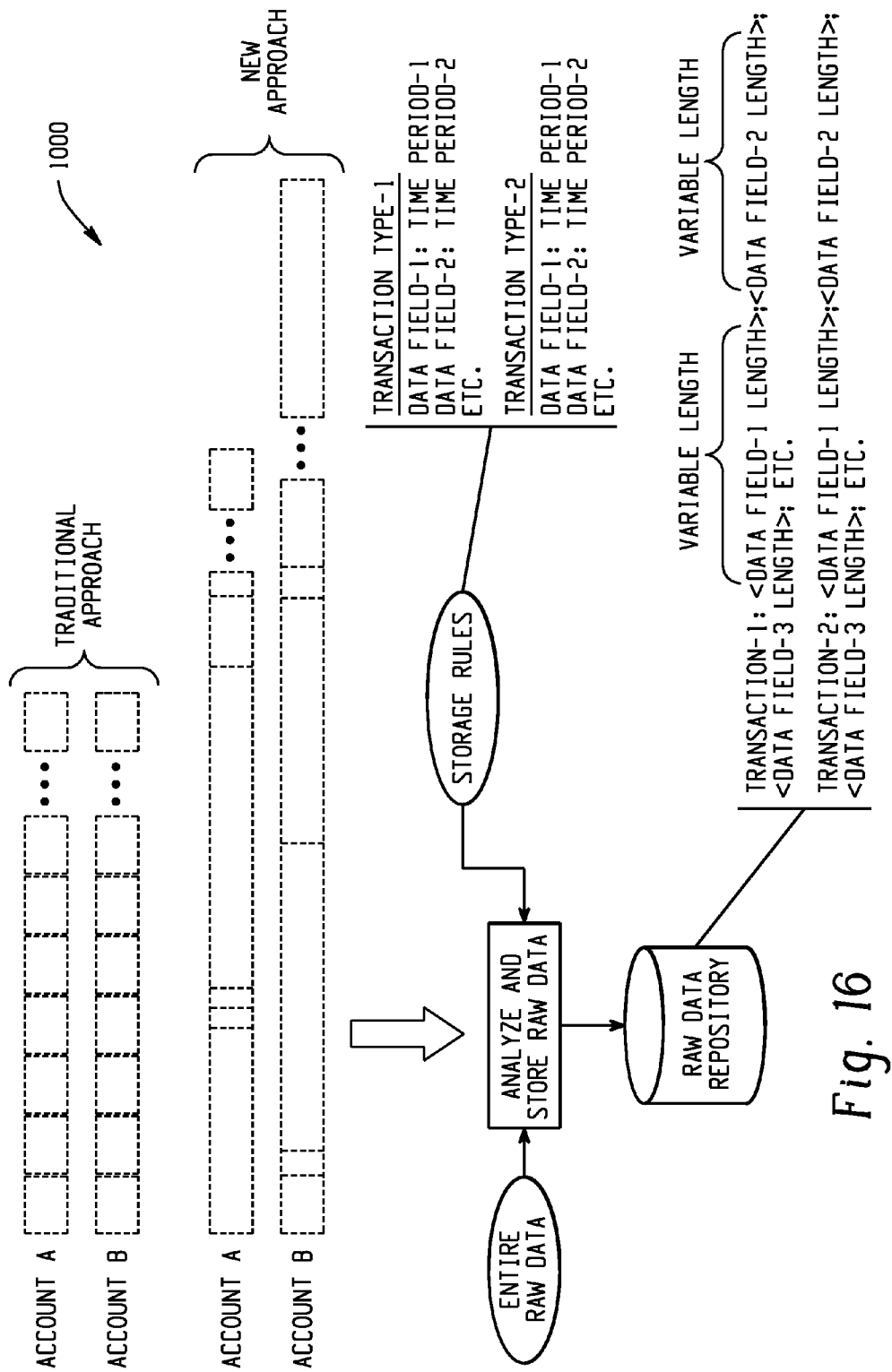
FIG. 16 is a block diagram depicting storage of fields within a data storage system.

In contrast, the system of FIG. 16 as depicted at 900 contains a repository of historical data 902. This is not aggregate or derived data but raw data. For example no summaries or averages of raw transactional data is stored in the repository 902. Raw data 904 is being processed and stored via process 906 and then retrieved (e.g., by fraud detection process 908) in order to determine whether an entity has been compromised. In other embodiments, a combination of raw data and derived data could be stored.

In the system, storage rules 910 specify how many generations of raw data 904 should be stored in the repository 902 (e.g., subset 912). This determination could include how many raw payment amounts should be stored. The determination of how many generations should be stored is based upon the type of transaction as well as the transaction fields. This may result in varying lengths of the fields being stored in the repository as illustrated at 1000 in FIG. 16. For example, the payment amounts for the last seven transactions may be stored in the repository. However for another type of information, only the previous five values need to be stored. Thus the length for one field might be seven generations in length, whereas for another field, only five generations in length might be stored in the repository. An advantage of storage of the raw data (in comparison with storage of aggregate or derived data) is that information that underlines the transaction is not lost due to process that may preserve only a top-level view of what has occurred. As an example of a storage rule, a storage rule can specify how many authorization amounts should be stored for an entity in the raw state (e.g., without any aggregation or other type of transformation into a derived variable).

The data can be stored in a circular list (e.g., a doubly linked list) for each field. They can comprise varying lengths in the circular lists for the data fields. A data field may have the previous three generations stored, whereas another data field may have the previous eight generations stored. The circular lists are stored in an indexed file. However it should be understood that other storage mechanisms may be utilized such as storage in a relational database.

It should be noted that the system can still operate even if not all of the generations for a particular data field has been stored. For example a relatively new card may have only enough raw data to store three generations of payment authorization amounts although the storage rules for this data field may allow storage of up to fifteen generations. A predictive model can still operate even though a particular data field does not have all of the generations specified by the storage rules.

The storage of raw data in the repository reflects a compromise between an ideal situation where all historical information that can be obtained for an entity is stored (that is used to make a prediction) versus the physical constraints of storage capacity and/or performance. In reaching that compromise it should be noted that a less than optimal situation might exist in determining what timeframe/number of generations should be stored for one or more data fields. It should also be noted that storage rules can use the number of generations (e.g., the previous four generations) and/or a particular timeframe (e.g., only the previous three weeks) in determining how much raw data for a particular data field should be stored. For situations where more generations, longer time frames are needed for a particular data field, a multi-resolution scheme can be used. In other words, the storage can store only every k events/transactions where k varies based on the recency of the transactions/events.

Storage rules dictate how far back in history should data be stored. The history can be at different levels, such as at the transaction level or at another level such as at an individual field level. As an illustration for an authorization the system may receive an authorization amount, a merchant identifier, and a date-time stamp. The system might decide that it does not need the same history for all these different pieces of data, so the system based upon the storage rules stores the past ten transaction amounts but only the previous five merchant identifiers. Thus the buffered lengths for the different data types could vary. Even the same field (e.g., the date-time stamp field) for two different transaction types may have different storage rules. For example for one type of transaction five generations of date-time stamps may be needed but for another type of transaction eight generations may need to be stored.

Signatures can be used within the system in order to help store detailed, unaltered history of the account/entity. The signatures provide a complete picture of the account, allowing on-demand scoring, and not just transaction-triggered scoring. The signature allows real-time use of variables which depend upon detailed information for a number of previous transactions, for example, distances (e.g., Mahalanobis distances) between recent and past transactions.

Signatures may look different for one person versus another person. For example for a particular type of information, fifteen generations of information might be stored for a first person whereas only six generations of the same type of information for a second person might be stored. This could occur, for example, if the first person utilizes their card many more times per month than the second person.

Signature records can be retrieved for one or more entities depending upon which entities need to be scored as well as which signature records are needed for scoring a particular entity. For example a scoring process may be configured to score a credit card holder's account only by utilizing the one or more signature records associated with that credit card holder. However another scoring process could be configured to score a credit card holder's account based not only upon that entity's signature records but also based upon one or more other entities' signature records (e.g., a merchant or terminal ID signature record).

Figure 17:
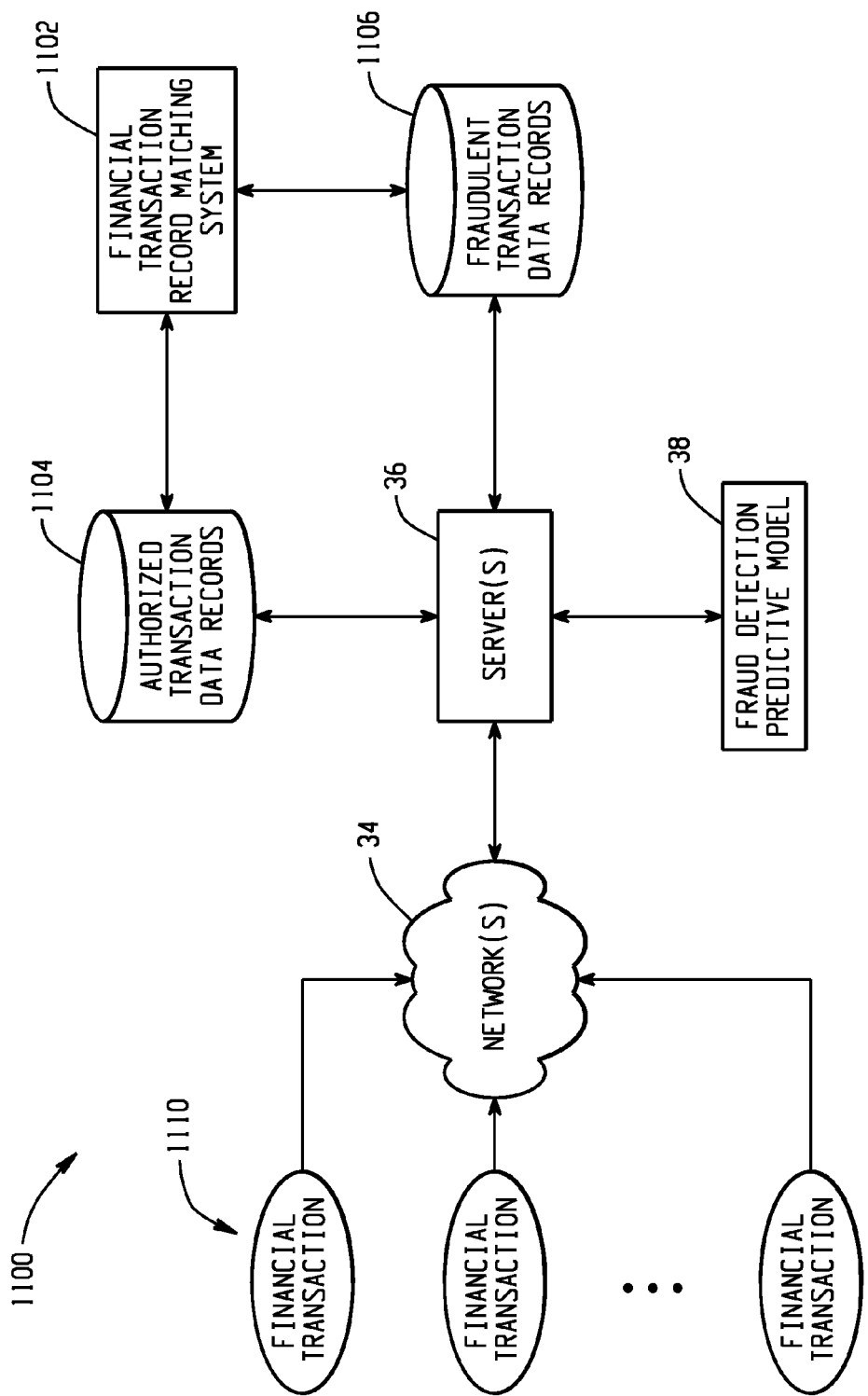
FIG. 17 is a block diagram depicting a financial transaction record matching system which attempts to match data records between the two databases.

The systems and methods can also include a financial transaction record matching system for processing financial transaction data records 1110 received over a network 34 or other source, as shown for example at 1100 in FIG. 17. In FIG. 17, a financial transaction record matching system 1102 processes data records from both a database 1104 which stores authorized transaction data records and a database 1106 which stores fraudulent transaction data records. The financial transaction record matching system 1102 attempts to match data records between the two databases (1104, 1106).

Data records in the authorized transaction database 1104 represent financial transactions which have been authorized by a financial institution. Data records in the fraudulent transaction database 1106 represent financial transactions which have been indicated as fraudulent financial transactions. The types of transactions which the system 1102 may handle can include a wide variety of financial transactions, such as credit card transactions.

Additionally, the data records in the databases (1104, 1106) can be stored at different times, thereby increasing the difficulty of identifying matching records between the databases. For example, a transaction may be authorized in real time with respect to when the transaction was occurring, and within that time period, the authorized database 1104 can be updated to reflect the authorization of the financial transaction. In contrast, the determination and storage of whether a financial transaction is fraudulent may not occur until much later on in the process.

Figure 18:
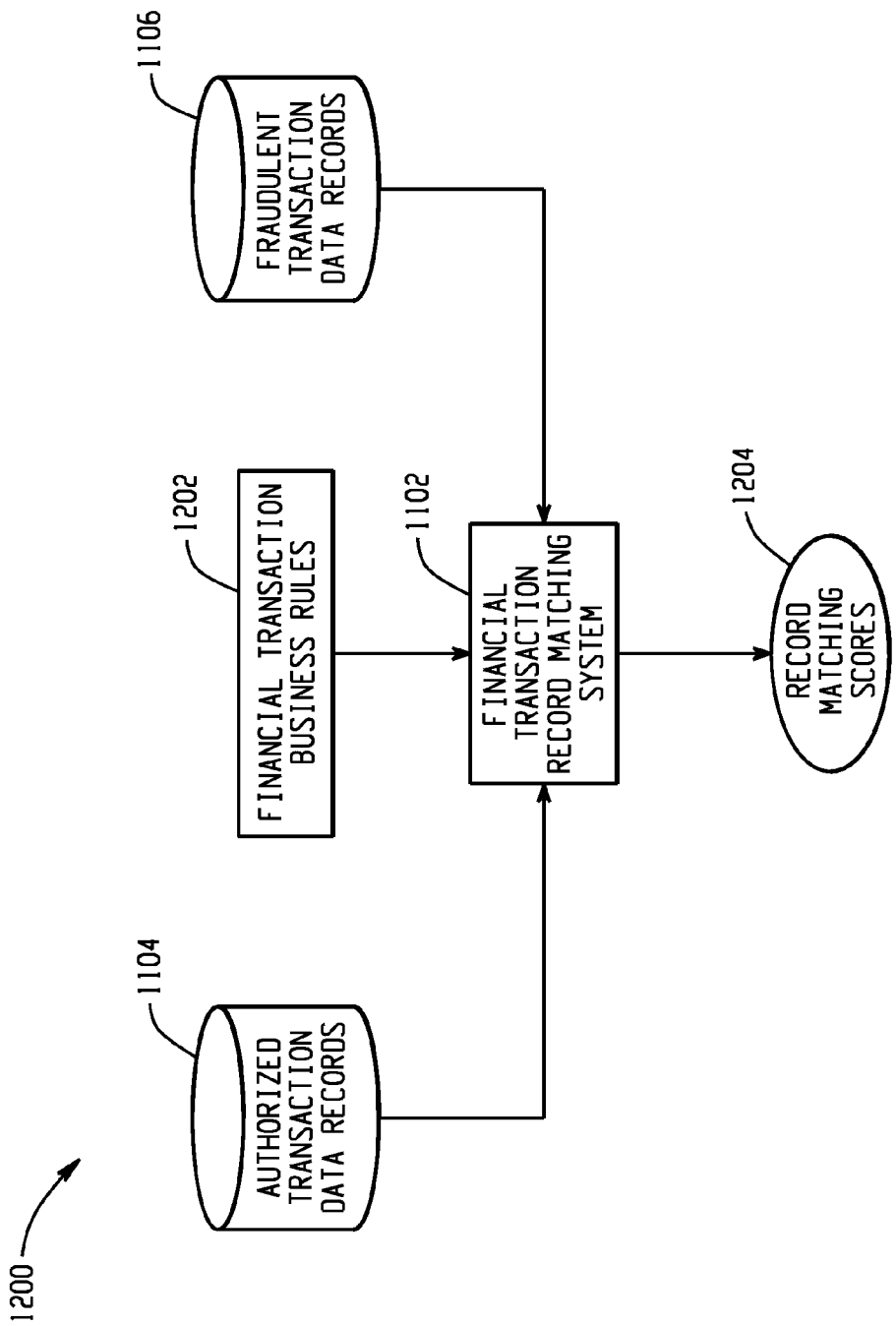
FIG. 18 is a block diagram depicting a financial transaction record matching system using financial transaction business rules to process the data records that are in the authorized transaction database and the fraudulent transaction database.

FIG. 18 depicts at 1200 the financial transaction record matching system 1102 using financial transaction business rules 1202 to process the data records that are in the authorized transaction database 1104 and the fraudulent transaction database 1106. The financial transaction business rules 1202 can be applied to an authorized transaction data record and a fraud data record for determining a degree of relatedness between the authorized transaction data record and the fraud data record. The greater the similarity between an authorized transaction data record and a fraud data record, the greater the record matching score 1204. In other words, the record matching score is indicative of how related the two data records are.

Figure 19:
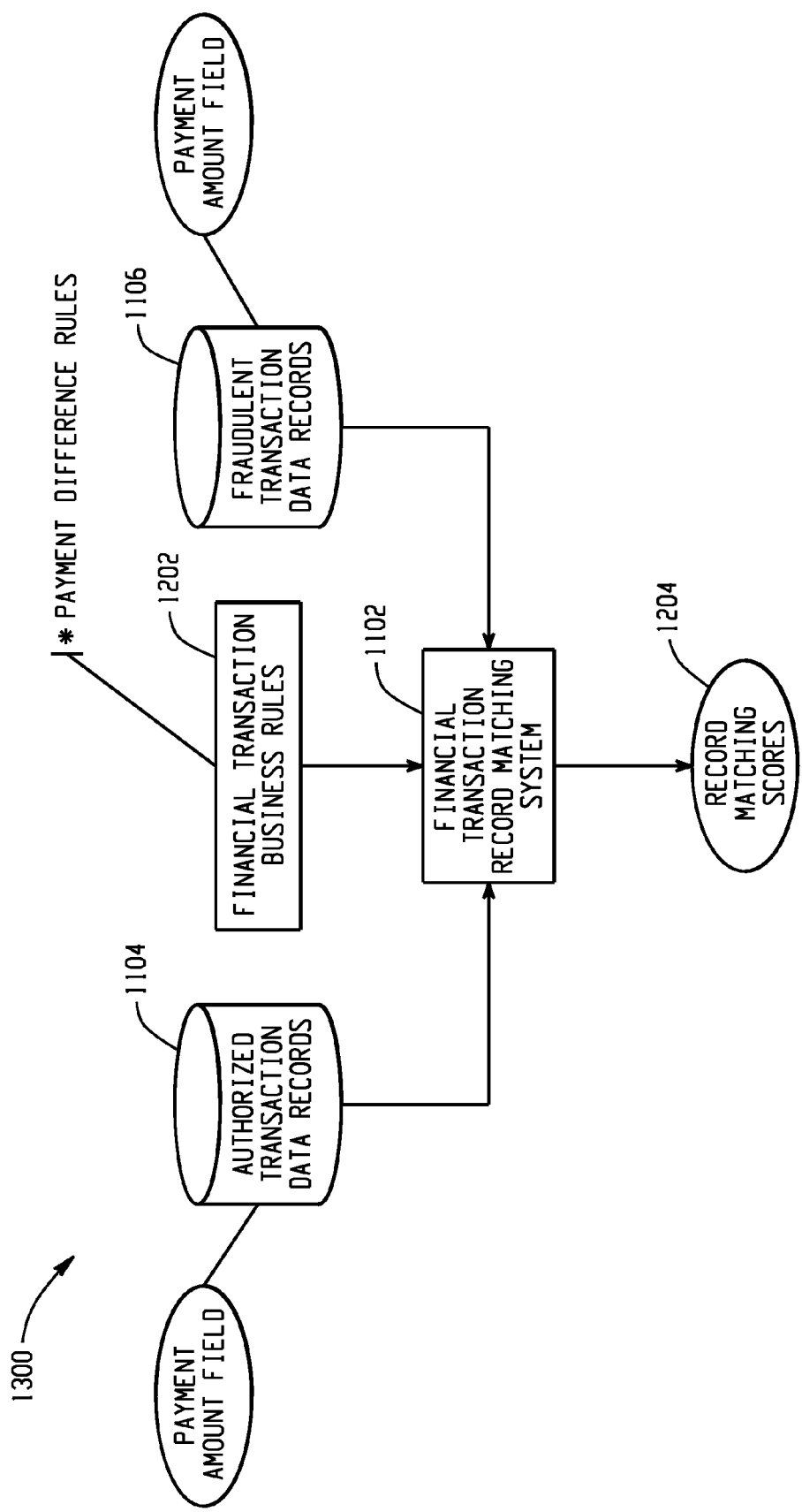
FIG. 19 is a block diagram depicting a financial transaction business rule that can be employed to help generate a record matching score.

FIG. 19 illustrates at 1300 a financial transaction business rule that can be employed to help generate a record matching score 1204. In this example, a financial transaction record matching system 1102 applies payment amount difference rules to payment information that is associated with data records in the authorized transaction database and the fraudulent transaction database. As an illustration, the payment amount field associated with an authorized transaction may differ from the payment amount field associated with its corresponding data record in the fraudulent transaction database. This can occur because the payment amount at the time of authorization may not be the same as the ultimate payment amount of the transaction, which is the value stored in the fraudulent transaction database. A payment amount difference rule can specify that two data records may be considered related if their respective payment amounts are within a predetermined amount.

Figure 20:
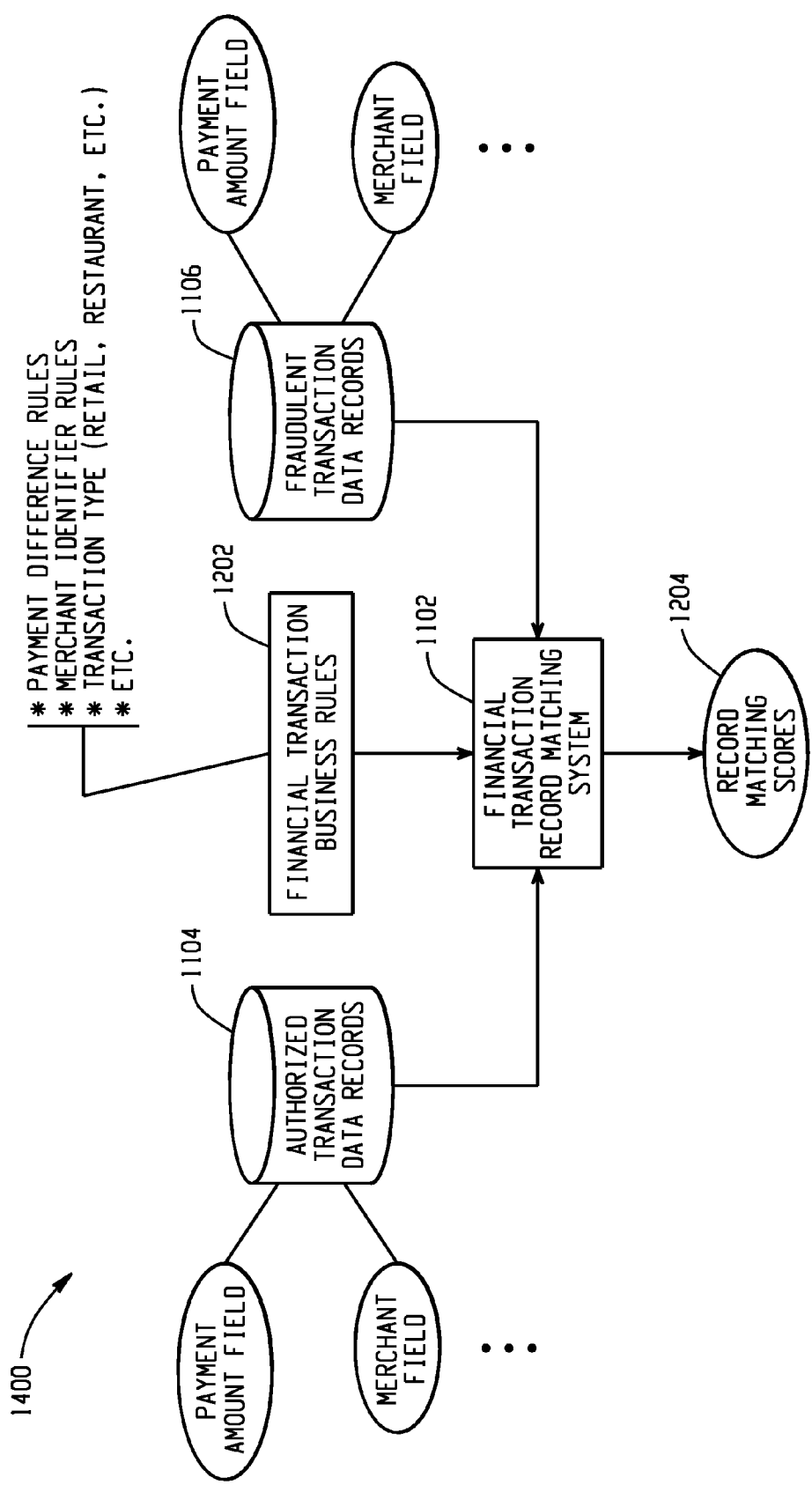
FIG. 20 is a block diagram depicting that additional rules can be used to help identify matching data records.

FIG. 20 illustrates at 1400 that additional rules can be used to help identify matching data records. In the example of FIG. 20, the financial transaction business rules 1202 can include not only payment amount difference rules, but also merchant identifier rules, type of transaction rules, etc. The merchant identifier rules allow for examining the degree of relatedness between two data records based upon the merchant fields contained in the authorized transaction database 1104 and fraudulent transaction database 1106. For example, an authorized transaction data record containing merchant information which is the same or similar as merchant information contained in a fraud data record increases the degree of similarity between the two records.

Another financial transaction business rule can include examining the type of transaction involved. For example, the transaction type may dictate what type of payment difference is acceptable for indicating how similar two data records are. If the type of transaction is a retail purchase type of transaction, then the transaction type rule may specify that there should be no difference in payment amounts for determining whether two data records should be matched. However if the type of transaction is a restaurant type of transaction, then the transaction type rule may specify what an acceptable amount of difference in payment amounts can be for determining whether two data records may be a match. In the restaurant context, the acceptable amount of difference can be set to recognize that a tip may have been added after the transaction has been authorized. For example, an acceptable amount of difference could be a 20% difference in the payment amounts because a tip has been added. It should be noted that that payment amounts may differ in other contexts (e.g., specific types of retail purchases, payment of a hotel bill, etc.), such as when a transaction involves currency exchange rate calculations. Additionally, financial transaction business rules can examine whether transaction dates associated with the authorized transaction data record and the fraud data record are within an acceptable, pre-specified time period (e.g., the dates are not too distant from one another).

Figure 21:
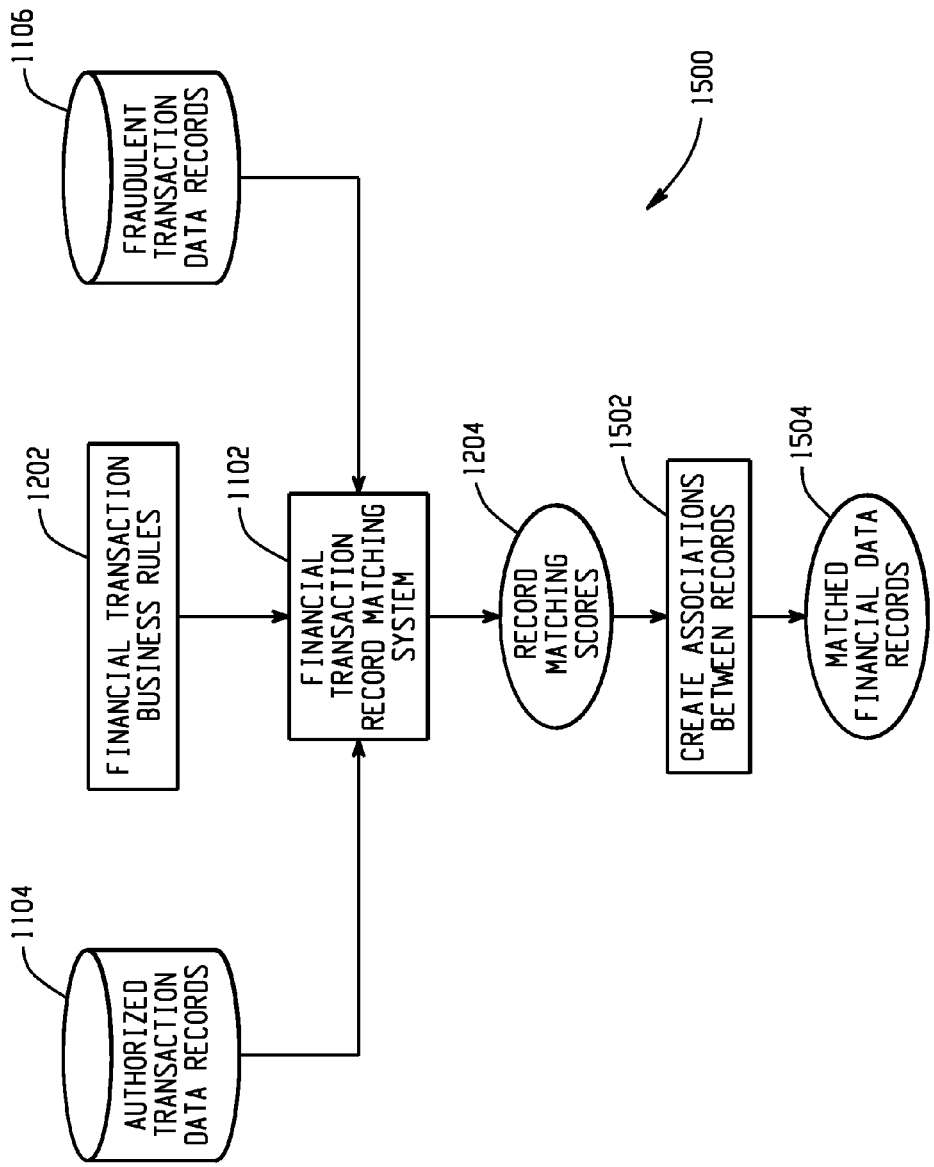
FIGS. 21 and 22 are block diagrams depicting the creation of financial data record matching scores.
Figure 22:
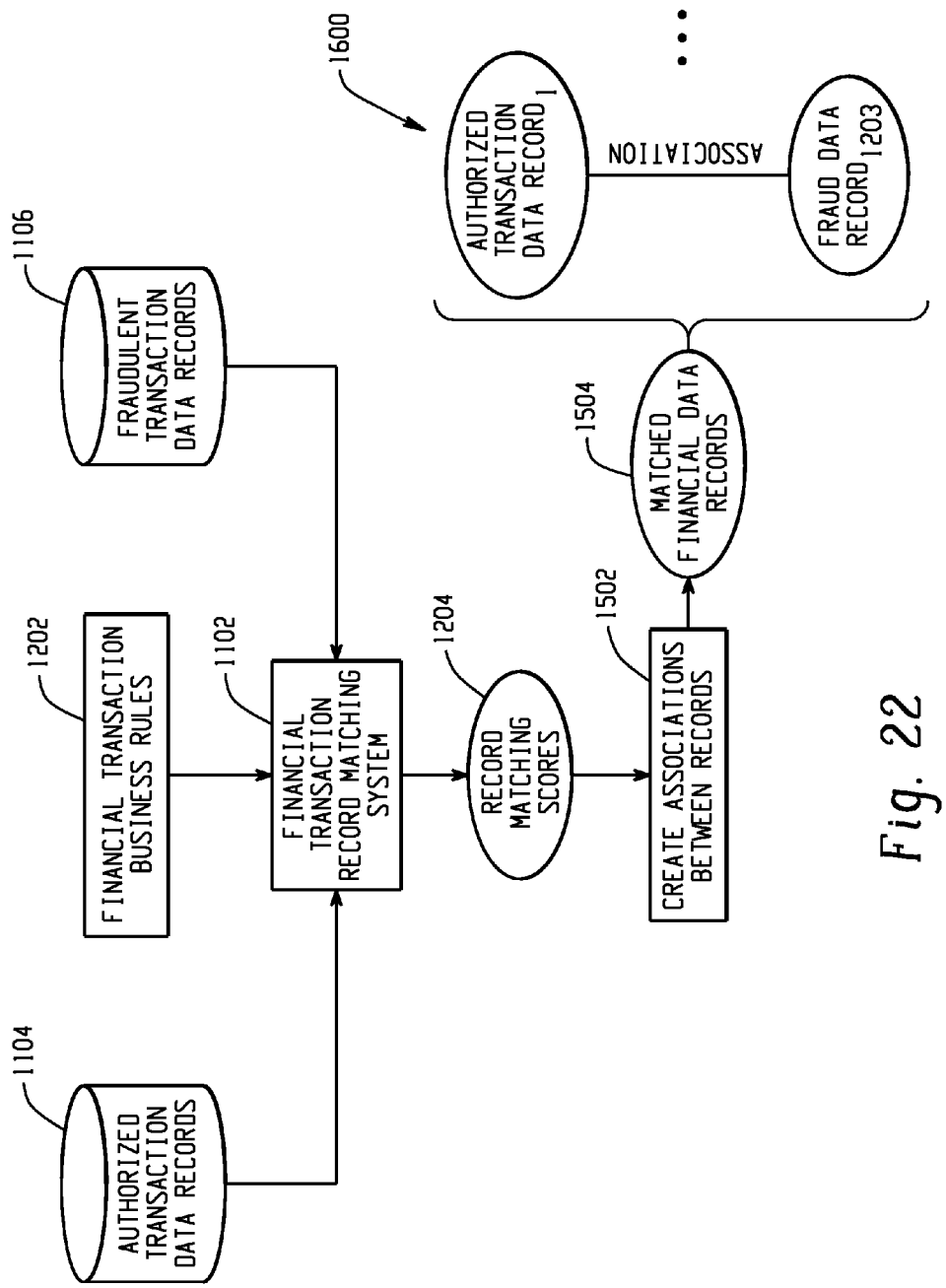

FIG. 21 depicts at 1500 that the system 1102 can use the financial data record matching scores to create associations at 1502 between the authorized transaction data records and the fraud data records, thereby creating matched financial transaction data records 1504. The higher the matching score is, the more likely the system will create an association at 1502 between two particular records as shown at 1600 in FIG. 22.

The matched records can be used for many different purposes. For example, the matched records can define time periods within which fraudulent activity has occurred. With the matching, more specific time periods of fraudulent activity can be ascertained, such as whether the fraudulent-activity time period is less than one day in duration, is less than four hours in duration, etc. As another example, the matching results can be used by one or more fraud analysis predictive models for predicting in a production environment whether an entity has been compromised, such as in a test merchant fraud situation. In this type of approach, the matched records can be used by the one or more fraud analysis predictive models (e.g., neural network models, decision tree models, linear regression models, etc.) for predicting whether fraud has occurred with respect to subsequent financial transactions that are received by the fraud detection system.

Figure 23:
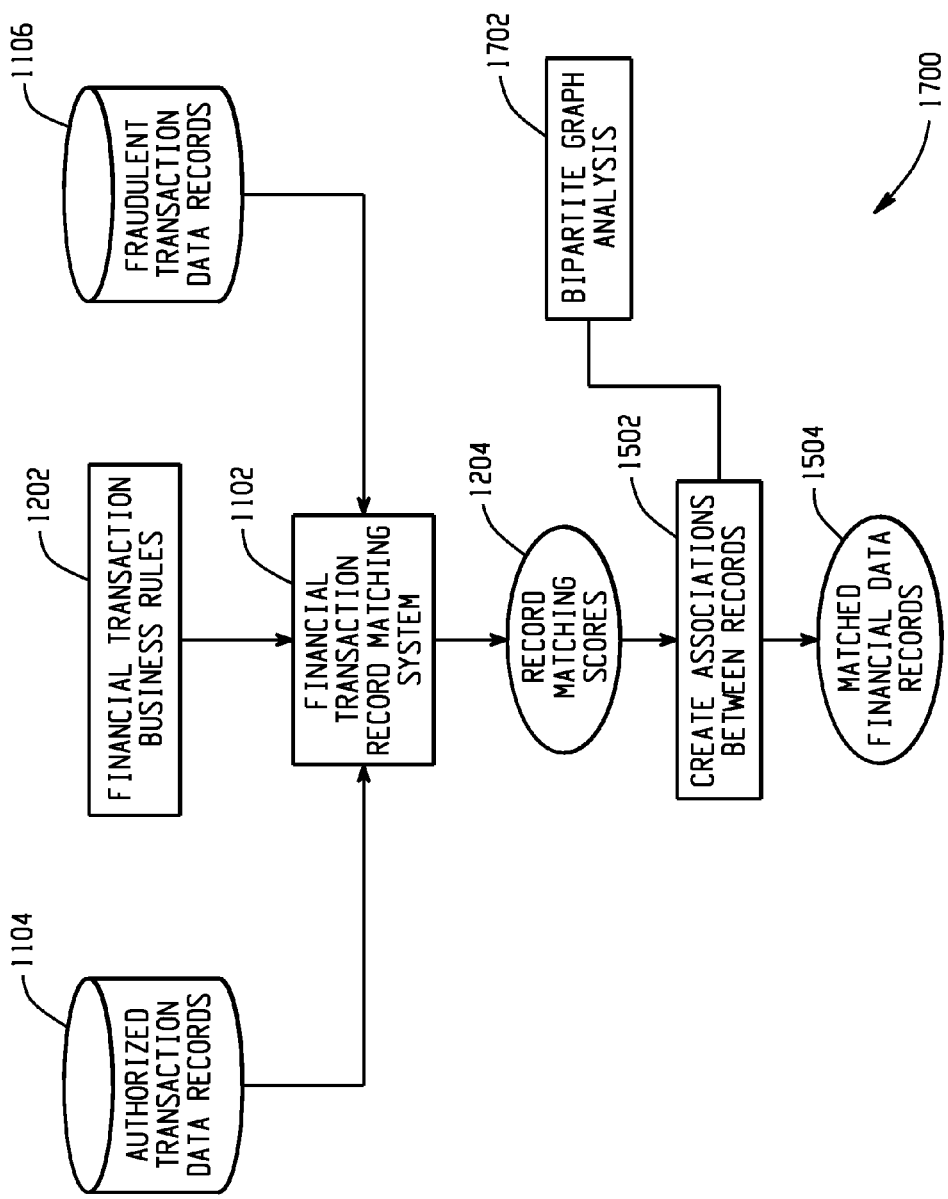
FIGS. 23 and 24 are block diagrams depicting graph analysis for creating associations between data records.
Figure 24:
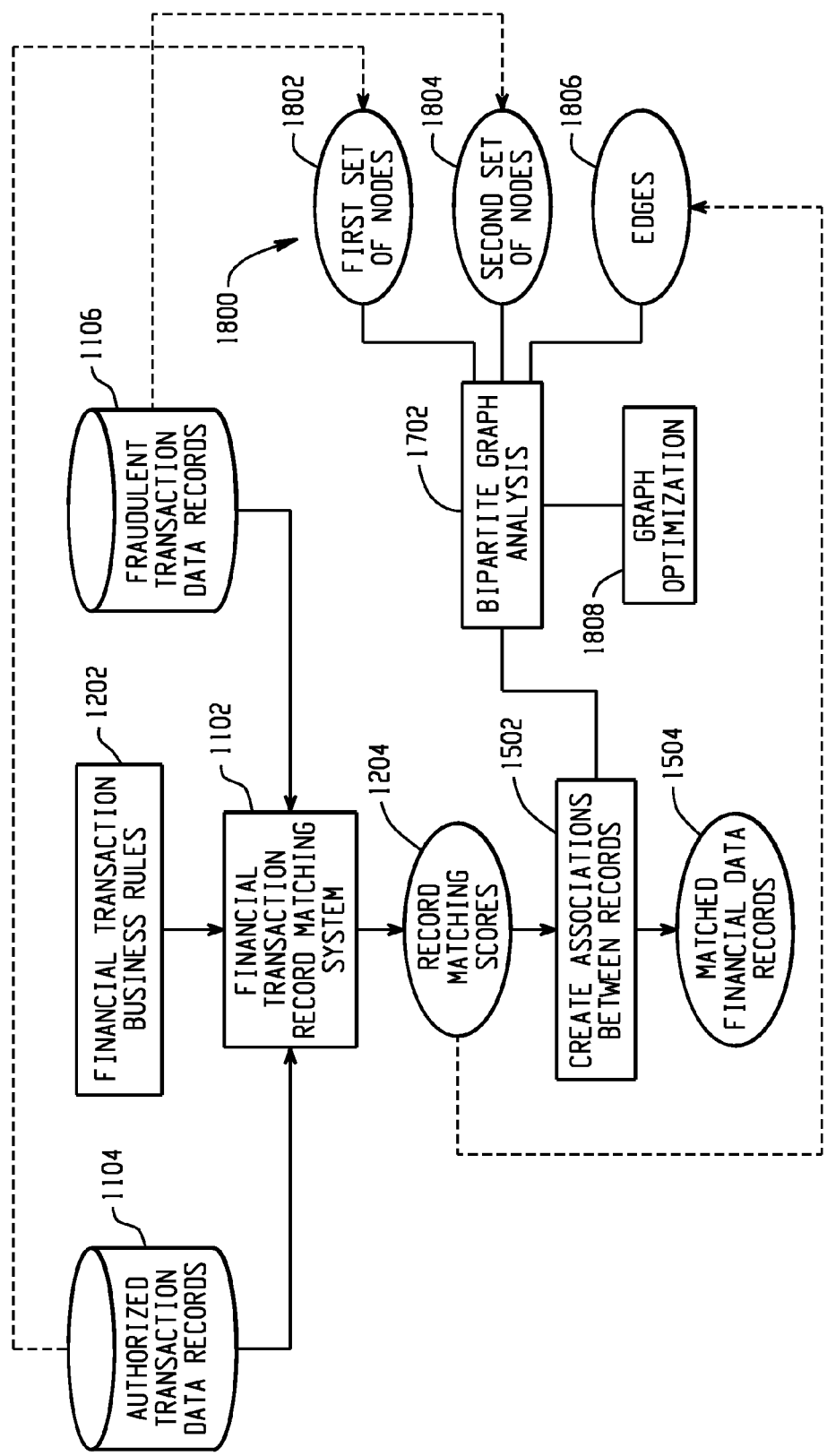

Different approaches can be used to create the associations between the records. For example as shown at 1700 in FIG. 23, a bi-partite graph analysis 1702 can facilitate which record should be associated with another in order to generate a set of matched financial data records. In FIG. 24, a bi-partite graph is shown at 1800 which has been generated for selecting matches between the authorized transaction data records and the fraud data records. In the bi-partite graph 1800, a first set of nodes 1802 represents the authorized transaction data records, and a second set of nodes 1804 in the bi-partite graph 1800 represents the fraud data records. The edges 1806 of the bi-partite graph 1800 connect nodes (e.g., which represent authorized transactions) contained within the first set with nodes 1802 (e.g., which represent fraudulent transactions) contained within the second set 1804, and values are associated with the edges 1806 based upon the determined matching scores. An optimal solution can be determined at 1808 for the bi-partite graph 1800 based upon the edge values and is used to specify which authorized transaction data records are associated with which fraud data records.

A greedy algorithm can be used by making by making the sum of weights the locally optimal choice at each iteration with the goal of finding the global optimum. For example, a greedy algorithm can find the minimum distance and shortest path in the weighted bi-partite graph from a given node and use that as a local optimum. Still further, the optimal solution can involve the following:

a. Maximize the total number of matched pairs which is useful if the 'weights' or 'similarity measure' are not reliable. The system may then optimize the number of matches.
b. Maximize the sum of the edge values of the matched pairs.
c. If the system optimizes both number of matches and the sum of weights of the matched, then an iterative approach can be used by:
  i. setting a initial cutoff $C_0$ for the edge values;
  ii. Perform maximal weight bi-partite graph matching on only the edges whose values are greater than the cutoff $C_0$;
  iii. successively reduce the cutoff value for $C_i$ and repeat Step iii and iv until $C_i$ is less than a particular value (e.g., a value indicating the matching quality is lower than a pre-determined value for the pair); and
  iv. perform maximal weight bi-partite graph matching on only the edges whose values are greater than the cutoff $C_i$.

As another example, a system for online identification and characterization of fraud episodes can be provided within a transactional-data stream, using fraud information from a source, generally different from that of the transactional-data stream, is desired. A fraud episode for a given card is the collection of all attempted transactions on that card that occur at or after the time of occurrence of the first fraudulent transaction on that card.

In this example, there exist two classes of data: A set of records describing authorization requests; A set of records describing fraudulent transactions. The sources of these two sets of data are generally dissimilar, so the domain of the elements is generally different amongst them.

The system in this example allows for a mapping from the set of records describing fraudulent transactions to the set of records describing authorization requests. If A is the set describing authorization requests, and F is the set describing fraudulent transactions, then let A' and F' denote these, respectively, with NULL appended to each. In that case, the desired objective is a mapping, M: A'↦ F', such that, for a∈A and f∈F, M(a)=f implies that the authorization request described by a was generated by the fraudulent transaction described by f. It is additionally required that each fraudulent transaction can be matched with at most one authorization, and each authorization can be matched with at most one fraudulent transaction.

Such a mapping provides information regarding the nature and time-of-start of the fraud episode, and particularly, which of the authorization requests were generated by fraudulent transactions.

As illustrated in FIG. 24, a graph framework is imposed upon the data, such that the data is represented by what is called a weighted bipartite graph. The elements of the set, A, constitute an independent set of vertices, while the elements of the set, F, constitute another. The existence and weighting on edges between these independent sets of vertices correspond to a similarity metric between the represented records.

From this graph-representation, a matching is derived. This matching corresponds to the desired mapping, M. A similarity metric, S: A×F↦ X, where X is a scalar numerical domain with the addition of NULL, is computed. Given a∈A and f∈F, S(a, f) corresponds to the likelihood that the authorization request, represented by a, was generated by the attempted fraudulent transaction, represented by f.

Design of such a similarity metric recognizes that the domain of the elements in A and that of the elements in F are generally different, and each is a mixture of numerical, lexical, categorical, and ordinal dimensions. Two comparable subspaces are constructed, one from the domain of the elements of A and one from that of the elements of F. This construction is dependent on the nature of the particular data and sources thereof, and on heuristics based upon a-priori information and expertise.

The scalar similarity measure between a∈A and f∈F is computed, as an inner product, from the respective projections of a and f onto these comparable subspaces.

The precise nature of S is dependent upon the nature of the particular data. The comparable subspaces into which elements of A and F are projected, as described below, are denoted as $A^x$ and $F^x$.

Generally, existing a-priori information and expertise will suggest that some subspaces of $A^x$ and $F^x$ are more relevant to matching than others. Examples include:

- It may be asserted that if the card numbers in a and f do not match with each other, then there is no similarity.
- A particular subspace of $F^x$, though comparable to some particular subspace from $A^x$, may be known to contain corrupt information, and it may be desired that it be ignored or partially suppressed for matching considerations.

Such concerns suggest a weighted inner product for the similarity metric, wherein the weighting corresponds to implications from a-priori information and expertise.

With respect to scaling considerations for dissimilar variable domains, $A^x$ and $F^x$ are generally mixed domains, composed of numerical, lexical, categorical, and ordinal dimensions, over which the data have generally non-stationary and different distributions. For example, transactional velocity may be higher during certain periods of time.

Moreover, the strength of the implication on overall similarity, by proximity in one particular dimension, is generally non-stationary, and generally different from that by proximity in some other dimension.

These items suggest that proximity information from each dimension be dynamically normalized, in some sense, against its respective empirical distribution, before being combined across dimensions into a scalar quantity. This normalization ought not reshape the empirical distribution over a single dimension, rather ought to equalize the scales of the empirical distributions across dimensions, so that the weighting in the inner-product calculation, constructed from a-priori information and expertise, is not superseded by generally intractable, temporal or inter-dimensional variations in scales of proximity that may be inherent in the data.

In order to construct the matching, the data is encoded as a weighted bipartite graph, and, then, a matching algorithm is executed on the resulting graph. Each of the sets, A and F, are represented as an independent set of vertices, also denoted as A and F, respectively, for ease of notation. These two sets of vertices fully constitute the set of vertices of the graph. For $a \in A$ and $f \in F$, if $S(a, f) \neq NULL$, then there exists an edge between a and f with weight equal to $S(a, f)$. These edges fully constitute the set of edges of the graph.

The matching procedure involves the construction of a matching, M such that the total weight of the matching, that is, $\Sigma_{a \in A} S(a, M(a))$, is maximized.

With respect to levels of measurement for the similarity metric, since the nature of the similarity metric is dependent upon the nature of the particular data and may be based upon ad-hoc heuristics and other subjective considerations, it may be difficult to maintain a tractable interval scale of measurement for it.

This indicates that a matching algorithm that operates with the assumption of only an ordinal level of measurement on the similarity metric may be more robust than one that is sensitive to scaling at an interval level of measurement.

It may be difficult to affirm that a similarity measure of x+E is as much better than x, as that of x is than x−E. Only taking into account that x+E is better than x, which, in turn, is better than x−E, may yield a more robust procedure.

Depending on the nature of the particular data, a greedy approach may yield a sufficiently sound matching. The greedy approach, described below, possesses the desirable quality of being insensitive to variations in scaling at an interval level of the similarity metric, as it assumes only an ordinal scale.

Algorithms for the construction of a matching in a bipartite graph, guaranteed to be a matching of optimal weight, can be used. Optimality, in this sense, by nature, assumes an interval level of measurement on the constituent quantities of the objective, which, in the present case, are the values of the similarity metric that are used as weights on the edges of the graph. It has been described herein that only an ordinal level of measurement be assumed on the similarity metric, S, and thus, in the present context, this notion of optimality loses meaning.

Additionally, the greedy approach is more straight-forward, in comparison to existing algorithms for matching in bipartite-graphs that are guaranteed to construct an optimal matching but are significantly more computationally complex. Since the matching is performed in near-real-time, computational economy is considered.

The essential modus operandi of the greedy method described herein is to sequentially select the most similar pair and add it to the matching. This is outlined in the following pseudo-code:

$A^{M4} \leftarrow A$ FM $\leftarrow F_{(a}(o), f(n) \leftarrow \arg \sup_{(a,f) \in A}$ co), $<_F (0)$ S(a,f)
Repeat while $S(a^{(i)}, f^{(i)})$ NULL:
　A I $(a^{(0)} f^{(1)}$
　$A^{i+1}) F A^{(1)} \backslash a^{(i)}$
　F(i+i) F(i) f(i)
　(a('),f$^{(')}$) arg$^{su}$p(a,f)EA(oxF(i)S(a,f)

Figure 25:
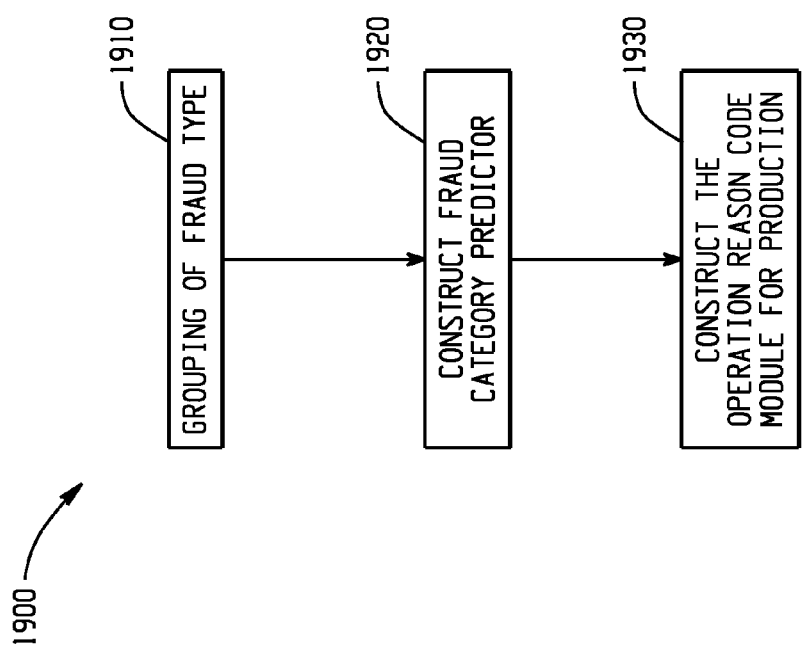
FIGS. 25 and 26 are block diagrams depicting approaches for the construction of operation reason codes.

FIG. 25 depicts an example at 1900 of an operational scenario by which a system can construct operation reason codes. At step 1910, different fraud types are grouped into various fraud categories. The grouping can be performed based upon a pre-specified criteria. For example, the grouping criteria can include grouping fraud types which have one or more similar characteristics. Step 1920 involves generating a fraud category predictor, such as by constructing a set of analytic models to estimate the likelihood of each fraud category. At step 1930, an operation reason code module is constructed for deployment into a fraud detection production environment.

Figure 26:
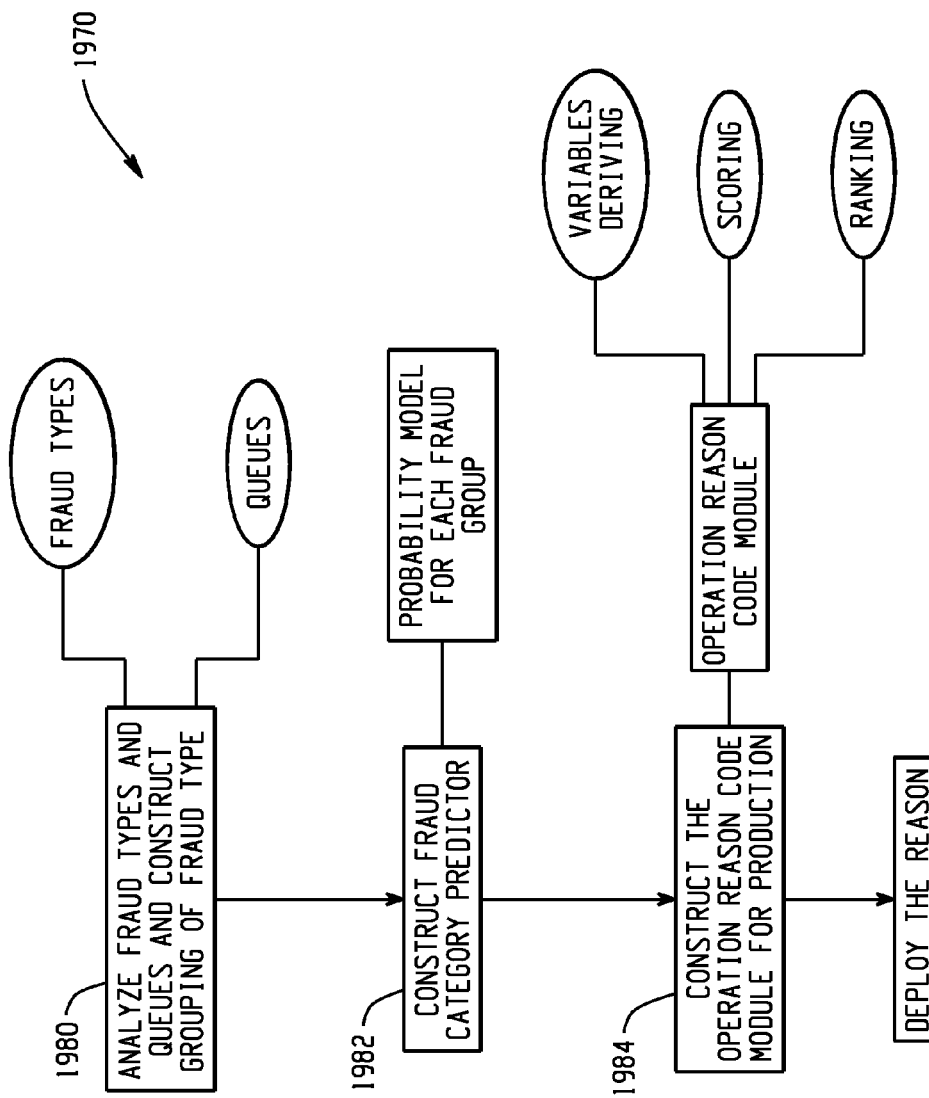

FIG. 26 depicts at 1970 an example of another scenario by which a system can construct operation reason codes. Alerts with similar characteristics can be configured to go to the same investigation queue. For example, such fraud types as fraud application, take-over and non-received usually go to a "first party fraud" queue. Therefore in this operational scenario, instead of directly predicting the potential fraud type of a given alert, the fraud types are first grouped at step 1980 in a particular fraud category. The grouping is done such that fraud types in each category are similar in nature and they can be routed to the same investigation queue. The grouping of fraud type can also be done based on other factors such as a domain expert's opinions and user preferences.

As an illustration, FIG. 27 illustrates that fraud types can be grouped into multiple categories. In the table of FIG. 27, four fraud grouping categories have been coded as 10, 20, 30, and 40. Each code indicates a particular grouping of one or more fraud types, which in this operational scenario, include a mail order/telephone order (MOTO) fraud grouping category (code 10); a first party fraud grouping category (code 20); a counterfeit fraud grouping category (code 30); and a lost and stolen fraud grouping category (code 40).

One or more fraud types can be included in each of the fraud grouping categories. In the table of FIG. 27, fraud categories 10 and 30 are associated with one type of fraud. Fraud category 10 is associated with mail order (MO) type of fraud, while fraud category 30 is associated with the counterfeit (CO) type of fraud. Fraud categories 20 and 40 are associated with multiple types of fraud. Fraud category 20 is associated with fraud application, take-over and non-received (FA, TK, and NR) fraud types, while fraud category 40 is associated with lost (LT) and stolen (ST) fraud types.

With reference back to FIG. 26, once the fraud type is grouped into different categories, step 1982 constructs a fraud category predictor. A fraud category predictor can comprise a set of analytic models to estimate the likelihood of each fraud category. For example, a fraud category predictor can be a multinominal logistics model, wherein the model to be fit is:

$$\log\left(\frac{\pi_j}{\pi_R}\right) = \alpha_j + X * \beta_j$$

where:
category R is the reference category,
$\pi_j$ is the probability of fraud category j.
$\alpha_j$ is the intercept parameter and $\beta_j$ is the regression parameter of each logit, and
X is the set of input variables.
Then, the probability estimates of the fraud categories are:

$$\pi_R = \frac{1}{1 + \sum_{j \neq R} \exp(\alpha_j + X * \beta_j)}$$

and, for i≠R, $$\pi_i = \frac{\exp(\alpha_i + X * \beta_i)}{1 + \sum_{j \neq R} \exp(\alpha_j + X * \beta_j)}$$

High-scoring fraud transactions (e.g., transactions whose score indicate a high likelihood of fraud) are used to build the above model. Variables are derived to capture information that is indicative of potential fraud category, such as:
Account age
Number of recent card-not-present transactions
Average distance from home of recent transactions
Recent non-monetary activities such as phone and address changes Various known variable selection techniques can be used to select a reasonable-sized set of variables for the training the fraud category predictor. After selecting a reference category, the multinominal logistic model can be built using different types of logistic procedure, such the SAS proc logistic procedure with "GLOGIT" link function and stepwise variable selection.

Although this model may be built using fraud transactions, it can be used to score all suspect transactions in production. Hence, analyses can be performed to understand how the model behaves on non-fraud cases.

At step 1984, an operation reason code module is constructed for production. Based on the fraud category predictor built in step 1982, the operation reason code module is created to be deployed at step 1986 into a fraud detection production system and become a part of the scoring engine. This module is comprised with functions to:
1. Derive the required variables for the fraud category predictor,
2. Score the given transaction to estimate the likelihood of the suspect case in each fraud category, and
3. Rank order the likelihoods and format output along to the specification. In this operational scenario, the operation reason codes are provided as a set of three four-digit numbers.

For interpreting operation reason codes, each of these four-digit numbers can be composed with two parts—the first two bytes indicate the fraud category and the second two bytes indicate the likelihood of the given transaction belong to such category if the transaction is indeed fraudulent. The most likely category is populated in the first operation reason and the second most likely category is populated in the next slot, and so on. As an illustration, three operation reason codes ("1080", "4013", and "3005") in production would mean, if the case is indeed fraud:
The most likely fraud category is 10-'MOTO Fraud' with 80% chance,
'Lost and Stolen' as the second most likely category with 13% chance,
Only 5% chance as a 'Counterfeit'.

The operation reason code module constructed in step 1984 is incorporated at step 1986 into the scoring engine in production. It is added after the scoring module. When the score of a given transaction is above a certain threshold, the operation reason code module is executed to generate three operation reason codes. The users can create rules to route the suspect alerts to different investigation queues based on these operation reasons. For example, a scenario could involve the following:
1. The first operation reason code is used to infer the most likely fraud category and direct the case to the queue handling that particular fraud category; or
2. If the probability of the most likely fraud category (the third and fourth digits of the first operation reason code) is greater than a pre-set threshold, the given alerts can be routed to the queue handling that particular most likely category. Otherwise, the case is routed to a general queue; or
3. If the probability of the most likely fraud category is sufficient larger than the second most likely fraud category (i.e., the third and fourth digits of the first operation reason code are sufficiently larger than that of the second operation reason code), the case can be routed to the queue handling that particular most likely category. Otherwise, the case is routed to a general queue.

Figure 28:
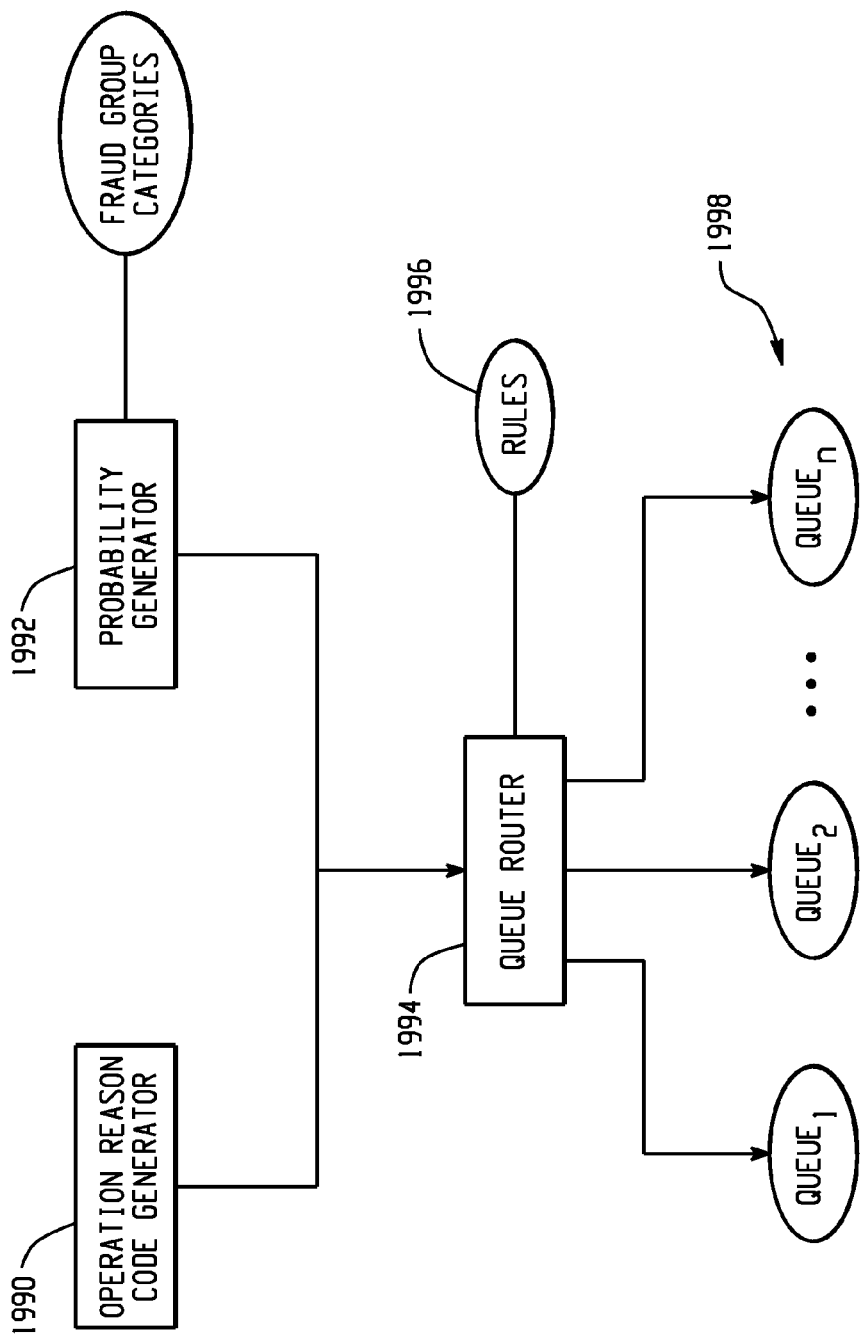
FIG. 28 is a block diagram depicting a system for providing operation reason codes.

FIG. 28 depicts another scenario wherein an operational reason code generator 1990 provides reason codes and a probability generator 1992 provides probabilities of how likely a particular fraud type might be. By applying this information to routing rules 1996 (as well as possibly other information, such as the fraud score), a queue router can determine which of the queues 1998 is most appropriate to handle a particular situation. As an illustration, the rules 1996 could include routing to a first queue if it is highly probable that a specific type of fraud has occurred and routing to a different queue if it is not only highly probable that a specific type of fraud has occurred, but also the dollar amount is above a pre-determined threshold (e.g., an expensive transaction). Additionally, the amount of dollar loss may also be predicted based upon the reason code, the probability value, and other information, such as the amount of money involved in the transaction.

The operation reason code approaches disclosed herein can be further extended as follows. The fraud score informs users what transactions are suspicious, whereas the operation reason codes inform the users how to deal with these suspicious transactions. The operation reason codes provide information to the users in selecting the appropriate actions on the suspicious cases. The providing of information to the user on "what to do" along with an analytic score can be used in other context beyond credit card fraud application. For example, in the setting of the collection, a collection score tells who is to be collected from and the operation reason codes provide information on the potential actions to maximize return.

While examples have been used to disclose the invention, including the best mode, and also to enable any person skilled in the art to make and use the invention, the patentable scope of the invention is defined by claims, and may include other examples that occur to those skilled in the art. For example, with respect to dynamic summarization, a generated summarization can include country code information, postal code, latitude and longitude, geo-location information, and terminal information. As another example, the generated summarization can include addresses, mobile device identifications, or other items represented by data in the transactions.

It is noted that the systems and methods may be implemented on various types of computer architectures, such as for example on a single general purpose computer or workstation, or on a networked system, or in a client-server configuration, or in an application service provider configuration.

It is further noted that the systems and methods may include data signals conveyed via networks (e.g., local area network, wide area network, internet, etc.), fiber optic medium, carrier waves, wireless networks, etc. for communication with one or more data processing devices. The data signals can carry any or all of the data disclosed herein that is provided to or from a device.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform methods described herein. Other implementations may also be used, however, such as firmware or even appropriately designed hardware configured to carry out the methods and systems described herein.

The systems' and methods' data (e.g., associations, mappings, etc.) may be stored and implemented in one or more different types of computer-implemented ways, such as different types of storage devices and programming constructs (e.g., data stores, RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

It is claimed:

1. A computer-program product tangibly embodied in a non-transitory machine readable storage medium, and including instructions configured to cause a data processing apparatus to perform operations including:
    accessing a set of data, wherein the set of data includes information about multiple transactions;
    computing a fraud score for each of the transactions, each of the fraud scores computed based on:
        a portion of data in the set of data that corresponds to that transaction; and
        a pre-determined fraud scoring model,
        wherein the fraud score represents a likelihood that a transaction falls within a pre-determined fraudulent category;
    identifying a plurality of entities, wherein each of the entities is associated with a subset of transactions from the multiple transactions, and wherein, in each of the subsets, the transactions are associated with a common parameter;
    generating a summary for each of the entities, wherein generating the summary includes identifying a fraudulent activity trend corresponding to the entity and wherein the fraudulent activity trend is determined using an analysis of the computed fraud scores;
    storing each of the generated summaries in a computer memory; and
    performing, on the computing device, a subsequent fraud detection on an additional transaction, wherein performing the subsequent fraud detection facilitates a decision for the additional transaction and includes:
        receiving additional transaction data that represents the additional transaction;
        associating the additional transaction with at least one of the identified entities; and
        computing a fraud score for the additional transaction, wherein computing the fraud score for the additional transaction is based on the additional transaction data, the pre-determined fraud scoring model, and the summary of the at least one entity associated with the additional transaction.

2. The computer-program product of claim 1, wherein the operations further include:
    re-evaluating one of the transactions using one of the generated summaries, wherein re-evaluating includes determining whether the re-evaluated transaction is associated with fraud.

3. The computer-program product of claim 1, wherein the operations further include:
    making a classification decision with respect to the additional transaction, wherein the classification decision is based on the fraud score for the additional transaction.

4. The computer-program product of claim 3, wherein the additional transaction occurs after the multiple transactions.

5. The computer-program product of claim 1, wherein generating a summary for each of the identified entities includes aggregating the computed fraud scores based on locational information within the set of data.

6. The computer-program product of claim 5, wherein aggregating the computed fraud scores based on locational information facilitates identifying at least one of the trends.

7. The computer-program product of claim 1, wherein at least one of the fraudulent activity trends includes multiple instances of suspicious activity or fraudulent activity occurring systematically at a particular location.

8. The computer-program product of claim 7, wherein associating the additional transaction with at least one of the identified entities includes determining that the additional transaction occurred at the particular location.

9. The computer-program product of claim 1, wherein the multiple transactions are credit card transactions and the set of data includes credit card numbers used in making the credit card transactions, wherein at least one of the summaries is generated by aggregating the fraud scores based on credit card number information.

10. The computer-program product of claim 1, wherein one of the fraudulent activity trends is associated with an attempt to fraudulently access credit card information, wherein the attempt includes using multiple consecutive credit card numbers, and wherein aggregating the fraud scores based on credit card number information facilitates identifying the trend associated with the attempt to fraudulently access credit card information.

11. The computer-program product of claim 1, wherein the fraud scoring model includes one or more neural networks.

12. The computer-program product of claim 1, wherein the multiple transactions include at least one of:
 financial transactions;
 debit card transactions; and
 online banking transactions.

13. A computer-implemented method, comprising:
 accessing a set of data, wherein the set of data includes information about multiple transactions;
 computing, on a computing device, a fraud score for each of the transactions, each of the fraud scores computed based on:
  a portion of data in the set of data that corresponds to that transaction; and
  a pre-determined fraud scoring model, wherein the fraud score represents a likelihood that a transaction falls within a pre-determined fraudulent category;
 identifying a plurality of entities, wherein each of the entities is associated with a subset of transactions from the multiple transactions, and wherein, in each of the subsets, the transactions are associated with a common parameter;
 generating, on the computing device, a summary for each of the entities, wherein generating the summary includes identifying a fraudulent activity trend corresponding to the entity and wherein the fraudulent activity trend is determined using an analysis of the computed fraud scores;
 storing each of the generated summaries in a computer memory; and
 performing, on the computing device, a subsequent fraud detection on an additional transaction, wherein performing the subsequent fraud detection facilitates a decision for the additional transaction and includes:
  receiving additional transaction data that represents the additional transaction;
  associating the additional transaction with at least one of the identified entities; and
  computing a fraud score for the additional transaction, wherein computing the fraud score for the additional transaction is based on the additional transaction data, the pre-determined fraud scoring model, and the summary of the at least one entity associated with the additional transaction.

14. The method of claim 13, further comprising:
 re-evaluating one of the transactions using one of the generated summaries, wherein re-evaluating includes determining whether the re-evaluated transaction is associated with fraud.

15. The method of claim 13, further comprising:
 making a classification decision with respect to the additional transaction, wherein the classification decision is based on the fraud score for the additional transaction.

16. The method of claim 15, wherein the additional transaction occurs after the multiple transactions.

17. The method of claim 13, wherein generating a summary for each of the identified entities includes aggregating the computed fraud scores based on locational information within the set of data.

18. The method of claim 17, wherein aggregating the computed fraud scores based on locational information facilitates identifying at least one of the trends.

19. The method of claim 18, wherein associating the additional transaction with at least one of the identified entities includes determining that the additional transaction occurred at the particular location.

20. The method of claim 13, wherein at least one of the fraudulent activity trends includes multiple instances of suspicious activity or fraudulent activity occurring systematically at a particular location.

21. The method of claim 13, wherein the multiple transactions are credit card transactions and the set of data includes credit card numbers used in making the credit card transactions, wherein at least one of the summaries is generated by aggregating the fraud scores based on credit card number information.

22. The method of claim 13, wherein one of the fraudulent activity trends is associated with an attempt to fraudulently access credit card information, wherein the attempt includes using multiple consecutive credit card numbers, and wherein aggregating the fraud scores based on credit card number information facilitates identifying the trend associated with the attempt to fraudulently access credit card information.

23. The method of claim 13, wherein the fraud scoring model includes one or more neural networks.

24. The method of claim 13, wherein the multiple transactions include at least one of:
 financial transactions;
 debit card transactions; and
 online banking transactions.

25. A system, comprising:
 a computer processor programmed to perform operations including:
  accessing a set of data, wherein the set of data includes information about multiple transactions;
  computing a fraud score for each of the transactions, each of the fraud scores computed based on:
   a portion of data in the set of data that corresponds to that transaction; and
   a pre-determined fraud scoring model, wherein the fraud score represents a likelihood that a transaction falls within a pre-determined fraudulent category;
  identifying a plurality of entities, wherein each of the entities is associated with a subset of transactions from the multiple transactions, and wherein, in each of the subsets, the transactions are associated with a common parameter;

generating a summary for each of the identified entities, wherein generating the summary includes identifying a fraudulent activity trend corresponding to the entity and wherein the fraudulent activity trend is determined using an analysis of the computed fraud scores;

storing each of the summaries in a computer memory; and performing a subsequent fraud detection on an additional transaction, wherein performing the subsequent fraud detection facilitates a decision for the additional transaction and includes:

receiving additional transaction data that represents the additional transaction;

associating the additional transaction with at least one of the identified entities; and computing a fraud score for the additional transaction, wherein computing the fraud score for the additional transaction is based on the additional transaction data, the pre-determined fraud scoring model, and the summary of the at least one entity associated with the additional transaction.

26. The system of claim 25, wherein the operations further include:

re-evaluating one of the transactions using one of the generated summaries, wherein re-evaluating includes determining whether the re-evaluated transaction is associated with fraud.

27. The system of claim 25, wherein the operations further include:

making a classification decision with respect to the additional transaction, wherein the classification decision is based on the fraud score for the additional transaction.

28. The system of claim 27, wherein the additional transaction occurs after the multiple transactions.

29. The system of claim 25, wherein generating a summary for each of the identified entities includes aggregating the computed fraud scores based on locational information within the set of data.

30. The system of claim 29, wherein aggregating the computed fraud scores based on locational information facilitates identifying at least one of the trends.

31. The system of claim 30, wherein associating the additional transaction with at least one of the identified entities includes determining that the additional transaction occurred at the particular location.

32. The system of claim 25, wherein at least one of the fraudulent activity trends includes multiple instances of suspicious activity or fraudulent activity occurring systematically at a particular location.

33. The system of claim 25, wherein the multiple transactions are credit card transactions and the set of data includes credit card numbers used in making the credit card transactions, wherein at least one of the summaries is generated by aggregating the fraud scores based on credit card number information.

34. The system of claim 25, wherein one of the fraudulent activity trends is associated with an attempt to fraudulently access credit card information, wherein the attempt includes using multiple consecutive credit card numbers, and wherein aggregating the fraud scores based on credit card number information facilitates identifying the trend associated with the attempt to fraudulently access credit card information.

35. The system of claim 25, wherein the fraud scoring model includes one or more neural networks.

36. The system of claim 25, wherein the multiple transactions include at least one of:

financial transactions;

debit card transactions; and online banking transactions.

* * * * *